(12) United States Patent
Sevcik et al.

(10) Patent No.: US 10,674,863 B2
(45) Date of Patent: Jun. 9, 2020

(54) DYNAMIC MIXER APPARATUSES FOR BEVERAGE DISPENSERS

(71) Applicant: Cornelius, Inc., Osseo, MN (US)

(72) Inventors: Scott E. Sevcik, Crystal Lake, IL (US); David K. Njaastad, Palatine, IL (US); Andrew J. Tobler, Geneva, IL (US); Vincenzo DiFatta, Wood Dale, IL (US); Daniel Prochaska, Elgin, IL (US); Fernando Sanchez, Chicago, IL (US); Dusan N. Ivancevic, Carol Stream, IL (US); Kurt F. Zoellick, Oak Park, IL (US); Bogdan M. Gheorghe, Oak Park, IL (US)

(73) Assignee: Cornelius, Inc., Osseo, MN (US)

( * ) Notice: Subject to any disclaimer, the term of this patent is extended or adjusted under 35 U.S.C. 154(b) by 744 days.

(21) Appl. No.: 15/267,629

(22) Filed: Sep. 16, 2016

(65) Prior Publication Data
US 2017/0000291 A1 Jan. 5, 2017

Related U.S. Application Data

(63) Continuation of application No. 14/006,747, filed as application No. PCT/US2012/030457 on Mar. 23, 2012, now abandoned.
(Continued)

(51) Int. Cl.
*A47J 31/46* (2006.01)
*B67D 1/00* (2006.01)
(Continued)

(52) U.S. Cl.
CPC ............. *A47J 31/46* (2013.01); *A47J 31/401* (2013.01); *A47J 31/41* (2013.01); *B67D 1/004* (2013.01);
(Continued)

(58) Field of Classification Search
CPC .......... A47J 31/401; A47J 31/41; A47J 31/46; B67D 1/0025; B67D 1/0026; B67D 1/004;
(Continued)

(56) References Cited

U.S. PATENT DOCUMENTS 2,625,720 A * 1/1953 Ross ........................ B41B 5/06
222/318
2,657,628 A 11/1953 Von Stoeser
(Continued)

FOREIGN PATENT DOCUMENTS

WO 9323327 A1 11/1993

OTHER PUBLICATIONS

International Search Report dated Sep. 7, 2012.

*Primary Examiner* — Lorne E Meade
*Assistant Examiner* — Ket D Dang
(74) *Attorney, Agent, or Firm* — Andrus Intellectual Property Law, LLP

(57) ABSTRACT

A beverage dispenser for dispensing either a hot or cold beverage, for example tea, from a common mixing chamber and a method for making and/or operating the same is disclosed. The dispense has a source of hot water, usually a heater, and a source of water, a refrigeration system to cool the water and one or more sources of flavor. The hot or cold water, or both can be provided to the common or same, mixing chamber and mixed assisted with a static and/or dynamic mixer and then dispensed. The last portion of the water is used to rinse for the next beverage. Flavor or syrup pump current is sensed to provide the appropriate amount of flavor concentrate to a known quantity of water to form a beverage of appropriate strength or syrup.

14 Claims, 19 Drawing Sheets

Related U.S. Application Data

(60) Provisional application No. 61/465,811, filed on Mar. 23, 2011.

(51) Int. Cl.
  *B67D 1/08* (2006.01)
  *A47J 31/40* (2006.01)
  *A47J 31/41* (2006.01)
  *B67D 1/16* (2006.01)

(52) U.S. Cl.
  CPC ......... *B67D 1/0025* (2013.01); *B67D 1/0026* (2013.01); *B67D 1/0046* (2013.01); *B67D 1/0047* (2013.01); *B67D 1/0057* (2013.01); *B67D 1/0864* (2013.01); *B67D 1/0877* (2013.01); *B67D 1/0895* (2013.01); *B67D 1/16* (2013.01)

(58) Field of Classification Search
  CPC .. B67D 1/0046; B67D 1/0047; B67D 1/0057; B67D 1/0864; B67D 1/0877; B67D 1/0895; B67D 1/16
  USPC ... 99/323.3, 287, 275, 289 R, 323.9, 323.11, 99/373, 407, 423, 580, 609, 611; 222/129, 129.1–129.4, 94, 105, 132, 222/146.6, 214, 145.5, 145.6, 148, 1, 133, 222/134, 135, 52, 56, 59, 64, 504, 566, 222/107; 141/10, 313, 114; 366/56, 366/76.3, 154.1, 158.4, 218, 342
  See application file for complete search history.

(56) References Cited

U.S. PATENT DOCUMENTS

| | | | |
|---|---|---|---|
| 3,252,619 A | 5/1966 | Miller | |
| 3,549,048 A * | 12/1970 | Goodman | G05D 11/006 222/57 |
| 3,634,107 A | 1/1972 | Cornelius | |
| 4,324,494 A * | 4/1982 | Pryor | A47J 31/401 222/129.3 |
| 4,566,287 A * | 1/1986 | Schmidt | B67D 1/0021 141/174 |
| 4,753,370 A | 6/1988 | Rudick | |
| 4,934,567 A | 6/1990 | Vahjen | |
| 4,934,597 A | 6/1990 | Vahjen et al. | |
| 5,072,853 A | 12/1991 | Shannon | |
| 5,271,521 A | 12/1993 | Noss et al. | |
| 5,312,017 A | 5/1994 | Schroeder et al. | |
| 5,413,252 A * | 5/1995 | Magnus | B67D 1/108 222/129.1 |
| 5,483,989 A | 1/1996 | Lim | |
| 5,603,257 A | 2/1997 | Kateman et al. | |
| 6,202,894 B1 * | 3/2001 | Struminski | B67D 1/0037 222/129.3 |
| 6,240,829 B1 | 6/2001 | McGarrah | |
| 6,554,165 B2 | 4/2003 | Cote | |
| 6,685,059 B2 | 2/2004 | Jones et al. | |
| 7,151,892 B2 | 12/2006 | Li et al. | |
| 7,287,898 B2 * | 10/2007 | Pauser | B01F 7/00008 222/145.5 |
| 7,624,896 B2 * | 12/2009 | Doglioni Majer | A47J 31/401 222/146.2 |
| 7,654,191 B2 | 2/2010 | Greenwald et al. | |
| 7,731,413 B2 * | 6/2010 | Busin | B01F 5/0619 222/145.6 |
| 2004/0144423 A1 | 7/2004 | Everett et al. | |
| 2005/0161469 A1 | 7/2005 | Roady et al. | |
| 2006/0000363 A1 | 1/2006 | Streeter et al. | |
| 2006/0011650 A1* | 1/2006 | Gomi | B67D 1/0406 222/23 |
| 2007/0205220 A1* | 9/2007 | Rudick | B67D 1/0025 222/129.4 |
| 2008/0206429 A1 | 8/2008 | Guerrero et al. | |
| 2008/0302818 A1 | 12/2008 | Minard et al. | |
| 2009/0065529 A1 | 3/2009 | Guadalupi | |
| 2009/0107342 A1 | 4/2009 | Piscaer et al. | |
| 2009/0285966 A1 | 11/2009 | Tso | |
| 2011/0062182 A1 | 3/2011 | Reynolds | |

* cited by examiner

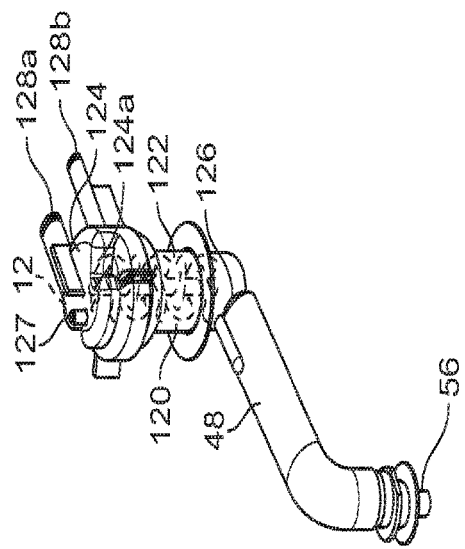
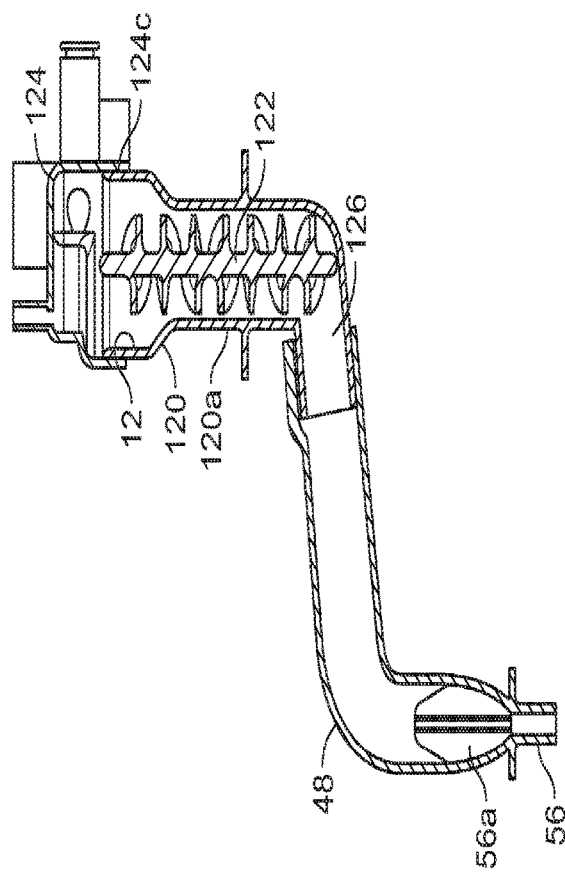

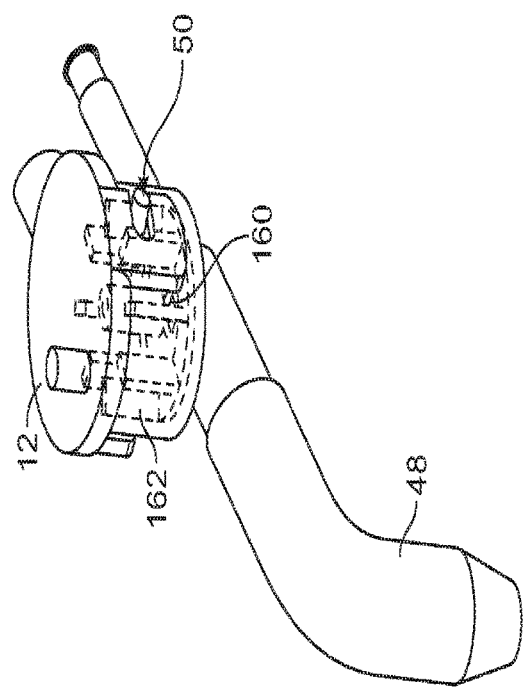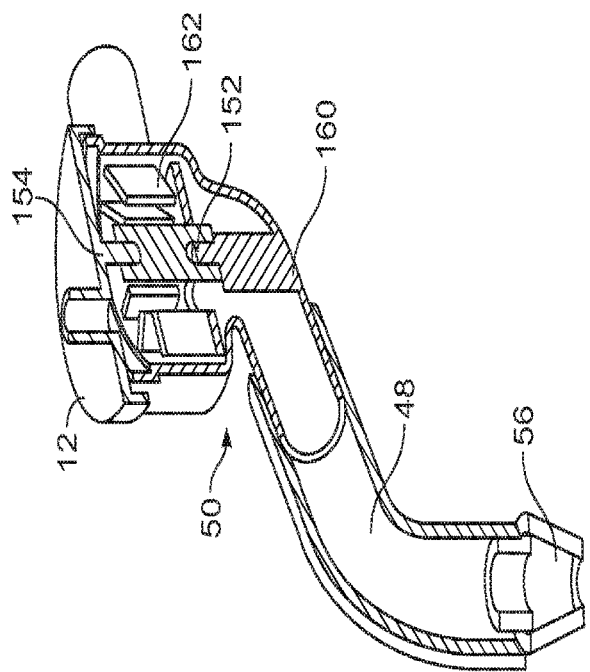

| Dispense Volume (grams) | RPM | Volts |
|---|---|---|
| 60.53 | 220 | 22 |
| 45.64 | 178 | 18 |
| 36.71 | 136 | 14 |
| 25.60 | 95 | 14 |

DYNAMIC MIXER APPARATUSES FOR BEVERAGE DISPENSERS

CROSS REFERENCE TO RELATED APPLICATIONS

The present application is a continuation of U.S. patent application Ser. No. 14/006,747, filed Nov. 27, 2013, which is incorporated herein by reference in entirety, which application is a National Stage Entry of PCT/US2012/030457, filed on Mar. 23, 2012, which is incorporated herein by reference in entirety, which application claims priority of U.S. Provisional Patent Application No. 61/465,811, filed Mar. 23, 2011, which is incorporated herein by reference in entirety.

DISCLOSURE

This application is a United States Patent Cooperation Treaty (PCT) Application, claiming the benefit and filing date of U.S. Provisional Application, Ser. No. 61/465,811, filed Mar. 23, 2011 of the same title, to which some new material has been added, and relates to a beverage dispenser, and methods therefore, and more particularly to a dispenser for dispensing one or more of both hot and cold beverages, and/or utilizes a common mixer to mix the ingredients, one of which is usually hot or cold water and the other one or more flavor concentrates, either statically or dynamically, and/or utilizes one or more peristaltic or other type displacement pumps to deliver the one or more flavor concentrates in desired amounts to a known quantity of the other ingredient (usually hot or cold water) to establish the desired Brix of the beverage. The invention uses pump motor current to determine flavor delivery to control Brix.

BACKGROUND OF THE INVENTION

Heretofore, it is known to have a dispenser deliver both hot or cold beverages, but not from the same spout.

It is known to form a beverage by mixing a known amount of concentrate with another ingredient, such as water, in an amount to provide the desired Brix of the beverage.

However it is not known to deliver either hot or cold water into a common chamber to form with the appropriate selected flavor concentrate either a hot or cold beverage. In the prior art, it is believed that the hot or cold water was delivered to two separate chambers (one for hot and another for cold) to form with the selected flavor concentrates either a hot or cold beverage in its own separate hot or cold chamber.

To control Brix, which is the ratio of the flavor ingredient to the total beverage (by volume or weight), heretofore it was established by determining the amount of flavor concentrate and then add sufficient other ingredient (usually water) to achieve the desired Brix, and hence establish the taste and quality of the beverage. For example, a desired beverage may vary in Brix for the beverage type (such as carbonated, non-carbonated, soda/cola, juice, smoothie, tea, etc.), by concentration of the flavor concentrate, by operator's/consumer's preference, etc. In the past, a selected Brix was achieved by adding the necessary amount of water to a known quantity of flavor concentrate.

Generally merely adding the flavor itself was insufficient, and it was necessary to mix the two or more ingredients together. For example, various mixers such as two separate static mixers were used in forming two beverages for providing either a hot drink or a cold beverage. It is believed not known to use the same mixer static or dynamic, to provide either a hot or cold beverage formed in a common chamber.

While it is known by various means to measure the volume or flow rate of a flavor concentrate, such as flow meters, pressure differentials, and even counting the number of rollers passing by in a peristaltic pump, it believed not known to measure the current of an electric motor driving the concentrate pump, such as a peristaltic pump, to determine the flavor concentrate volume.

SUMMARY OF THE INVENTION

A beverage dispenser and/or method therefore of the present invention is provided that can deliver alternatively both a hot or cold beverage alternatively formed in the same common chamber. The beverage dispenser of the present invention can provide, as desired, a soda, juice, coffee, tea, carbonated or non-carbonated, and hot or cold. For example, and not by limitation, a hot or cold coffee or hot or cold tea could be delivered, or a carbonated or non-carbonated soda or juice could be delivered. All these beverages can be formed in a single dispenser and in the common chamber to which the necessary flavor concentrates and/or or both hot and cold water can be delivered, as desired. In fact, various ratios of hot to cold water can be delivered to form a beverage of different, desired temperatures, from hot, all hot water—no cold water, to any intermediate temperature—various amount of hot and cold water, to cold, all cold water—no hot water. Similarly, the strength or amount of the flavor concentrate can also be varied too, from full strength to weak strength, as desired. This flavor variance can be brought about by providing a beverage with various, desired Brix.

As noted above, a novel feature is the addition of the desired or selected amount of flavor to a known quantity of water (cold or hot or both), into a common mixing chamber. As noted, this is believed to be a feature not heretofore provided.

The ingredients, whether hot or cold water or various proportions of each, are mixed with the selected flavor concentrate by adding the favor concentrate and shearing it with the water flow as the flavor flows into the mixing chamber, the flavor and water moving in different directions or at angles to each other, and preferably perpendicular to each other. To determine the amount of flavor concentrate delivered, a peristaltic pump or other type pump driven by an electric motor is used. The motor generally drives a high ratio gear box, which in turn drives the peristaltic, microdiaphragm, gear, piston/cylinder, vane, displacement other type pump. The motor operates at a relatively high speed (say from 9000 to 12000 rpm). The motor drives a gear box, which could be of a multiple gear or worm type to give a high gear ratio of say (100:1 to or 20:1, with preferably about 40:1±10:1). It has been found that with the high speed electric motor driving the peristaltic or other pump through a high ratio gear box, the rate of flavor delivery becomes sufficiently proportional to the amount of current drawn by the motor. As it is easily determined whether this motor current is flowing or not, from the time the current flows the volume (Vt) or weight (Wt) of flavor delivered can be determined from:

$$Vt \text{ or } Wt = K \times I \times \Delta T$$

Where Vt or Wt is volume or weight for a given time

K is a constant

I is the average current sensed when the pump is driven, and

ΔT is the time the current is on.

Thus, when a known quality of water is delivered over $\Delta T$, then the Brix can be adjusted or changed and the amount of flavor delivered by controlling or sensing the current I of the peristaltic or other pump motor used to deliver the flavor or syrup.

The various selection and operating parameters can be selected and inputted into a digital controller and software program to control the operation of this beverage dispenser.

Thus the Vt or Wt can be known from or varied by changing I and/or $\Delta T$, or both.

To increase uniformity of the beverage, the mixer can be provided which could be static or dynamic in operation. Static mixers per say are known and, for example, is shown in FIG. 4 of Publication No. US 2010/0147414 A1.

Instead of, or in addition to a static mixer, a dynamic mixer can be provided. The dynamic mixer has hot water input flowing into it (under gravity) and/or cold water input flowing into it (not under gravity but under city water supply or reduced pressure) and is injected tangentially into the mixing chamber. The flavor or syrup enters from the top and downwardly. The water enters preferably perpendicularly to flavor and the axis of the chamber, but at some radius from its center. Mounted rotatably in the chamber on its axis, is an impeller which has a vertical axis which is preferably close to or coincides with the axis or shaft of the chamber. Preferably the impeller axis is offset somewhat from the chamber center line to insure fast initiation of rotation. The hot or cold water or both, entering the chamber causes the impeller to rotate and further shearing the flavor and mixing it into the water. Generally, for spacing purposes to obtain the separate access for the same in the chamber, the hot and cold waters entrances could be spaced apart and on opposite sides, which would cause the impeller to rotate in different directions depending which water was used. Where both hot and cold water are to be injected simultaneously, then it may be advantageous to place the hot and cold water entrances on the same side of the chamber so that either drives the impeller in the same direction, rather than opposite directions.

The liquids hot and/or cold water and flavors move toward the open bottom and near center of the impeller and are discharged either into a delivery sprout and then into the cup of or for the customer. In an alternative constructions, the dynamic mixer could discharge into a lower static mixer, and then into the sprout and/or cup of the customer.

The finished beverage may be discharged from the mixer (dynamic, static or both) to an extended spout which extends away from the dispenser, in contrast to prior art spouts which were semi hidden and particularly or completely under the dispenser, and difficult for the customer to see, use, and do so without spillage.

The hot water is supplied for the dispenser by a vented to atmosphere hot water heater, so no pressure or boiler requirements need be met. The heater has an electric heating element, is higher than the mixing chamber and utilizes the top couple of inches of the heater tank for discharge to the mixing chamber solely by gravity. By taking the hot water from the top of the heater additional energy is made available for mixing due to the greater height of fall. Replacement water is brought into the bottom at of the heater and heated as it moves upwardly in the heater, where it can then be discharged as needed. Thus, the heater can provide a considerable number of hot drinks, as the cold water is not put into the top but at the bottom of the heater, wherein it can be considerably heated before it is discharged. A three electrical probe (+ or − terminals) that are part of water level control and used to admit additional water into the heater as it is drawn off for beverages. The electrical probes sense filled (+) at top, common (−) lowest height) and low level (mid height (+)).

The dispenser has a refrigeration system, such as a compressor, expansion valve or device, evaporator and condenser, with the compressor driven by an electric motor. The evaporator is located in a cold water bath, which provides cold water for dispense and also can provide cold water to cool by circulation thereto the flavor concentrate or concentrates in a cold storage cabinet of the dispenser to help deliver a cold (40° F. or less) drink or beverage. Concentrates for hot beverages that might not require refrigeration for preservation could, if desired, be stored elsewhere. If the hot concentrates require refrigeration for preservation, they too can be stored within the cold storage cabinet.

The various components, valves, solenoids, pumps, motors of the dispenser can be controlled by a digital controller having a user/customer/operator interface or interfaces and software input/output menu so that the dispenser can be programmed, changed, controlled and operated to give the desired beverage dispense. The operation of the heater and compressor are interrelated. This feature is important because it optimizes our heater capacity and also makes sure that the heating elements and compressor do not turn on at the same time. Because the machine is designed to run at 15 Amps if both turned on at the same time it could blow a breaker or fuse.

The water too may be uncarbonated or sent through a carbonator to provide carbonated water. While either or both hot and cold water could be delivered from the carbonator, generally the cold water would be carbonated, although the dispense would be prepared to deliver both hot water and carbonated or uncarbonated cold water.

BRIEF DESCRIPTION OF THE DRAWINGS

FIGS. 6A to 6D are illustrations of one form of common chamber and mixer, in this instance, a static vortex mixer, for thoroughly mixing together the ingredients of beverage, with 6A being a see through assembly thereof, 6B being cross-section thereof, 6C being an exploded perspective view thereof, and 6D being an enlarged perspective view of the interior of the top of the common chamber.

FIGS. 8A to 8E are illustrations of another form of common chamber and mixer, in this instance, the dynamic rotating impeller mixer shown in FIG. 7, with FIG. 8A being a perspective view of the assembled mixer with its top transparent, FIG. 8B being a perspective cross-section of the assembled mixer, FIGS. 8C and 8D being exploded perspective views of this mixer from two different view points, and FIG. 8E is an assembled perspective view of the dynamic mixer.

DESCRIPTION OF THE PREFERRED EMBODIMENTS

Figure 1:
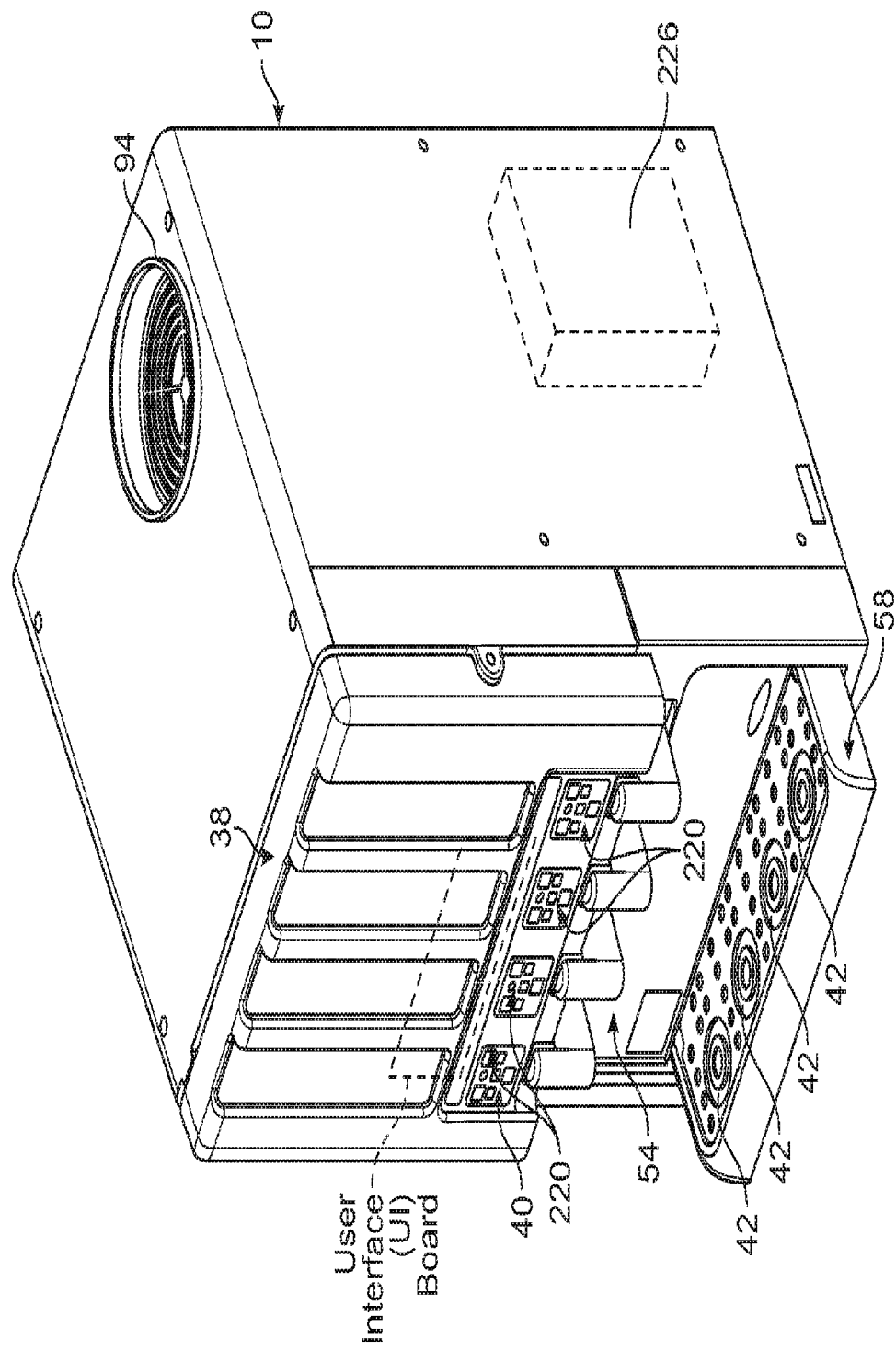
FIG. 1 is a perspective view of the exterior of a beverage dispenser which can incorporate one or more features of the present invention.
Figure 2:
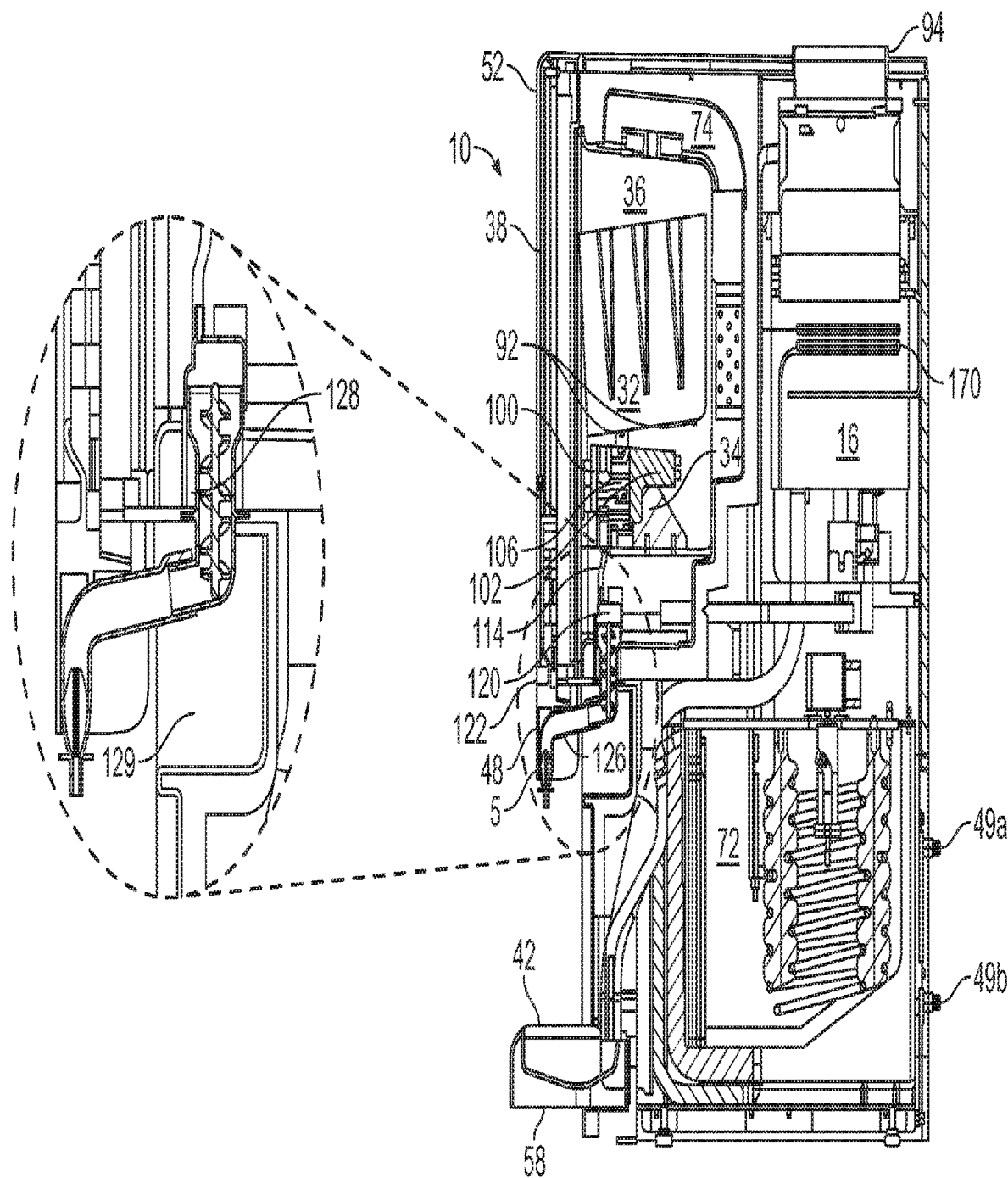
FIG. 2 is a cross-sectional view of a dispenser of the type shown in FIG. 1 and is capable of dispensing hot or cold beverages, having a lower refrigerated ice bath, cooled product storage cabinet, water heater, common mixer and accessible dispense spout.
Figure 3:
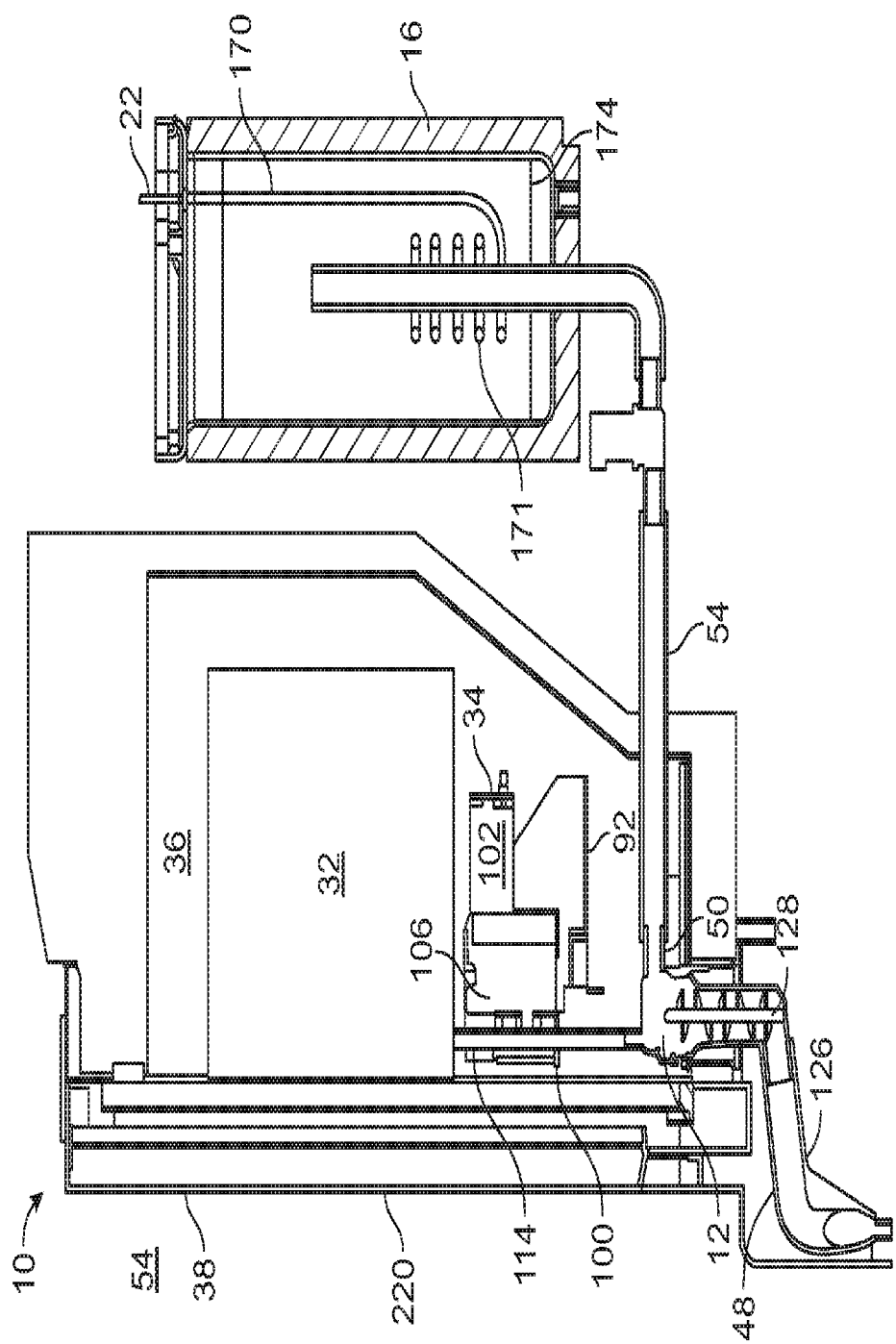
FIG. 3 is a schematic cross-section of the upper portion of the dispenser shown in FIG. 2.
Figure 4:
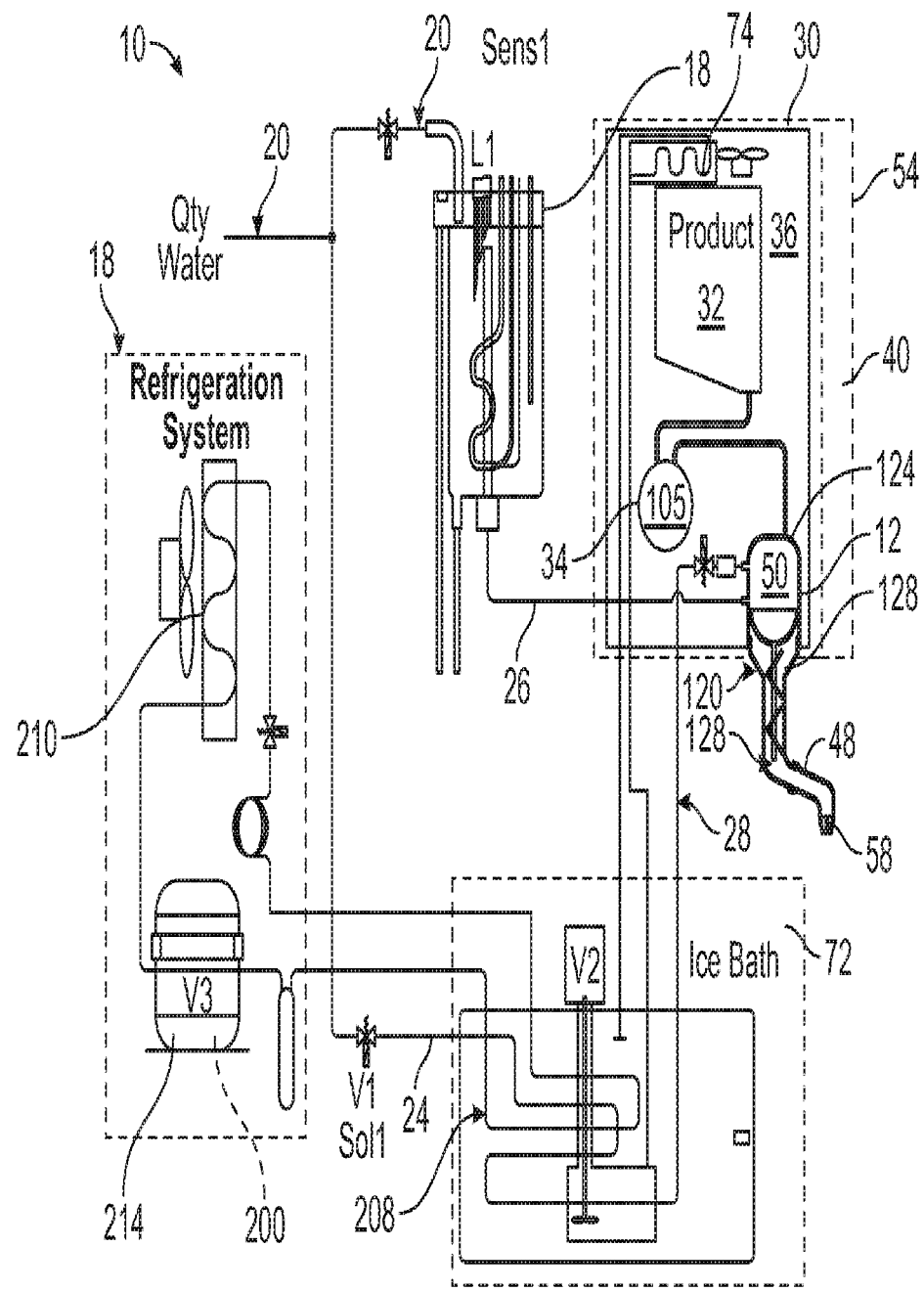
FIG. 4 is a schematic of the dispenser shown in FIG. 2, including the refrigeration system therefore.
Figure 5:
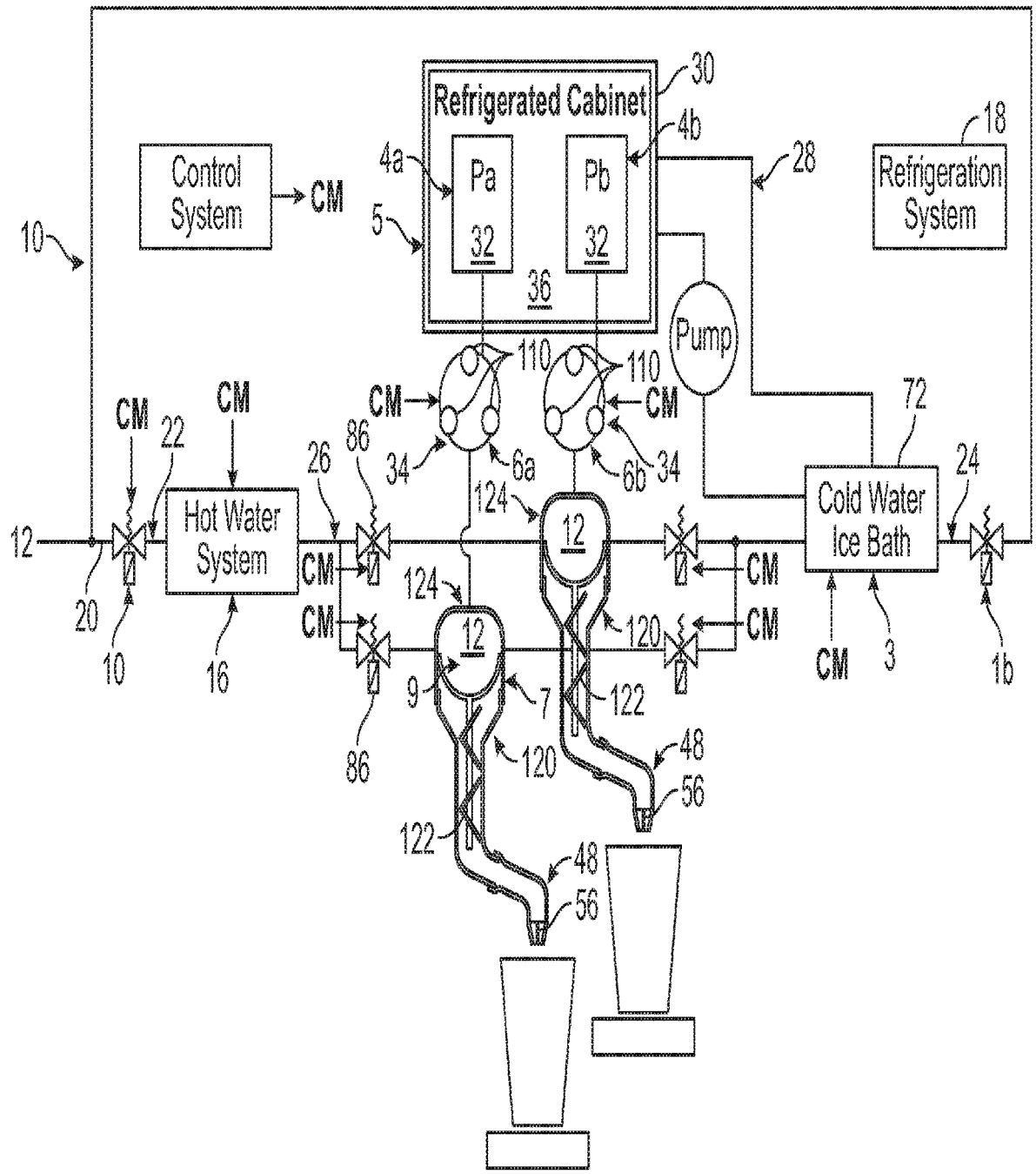
FIG. 5 is another schematic, but this illustrates the dispenser may have multiple static mixers and dispense spouts for dispensing say from one, two (or even twelve or more—or any number in between) flavored beverages.
Figure 5A:
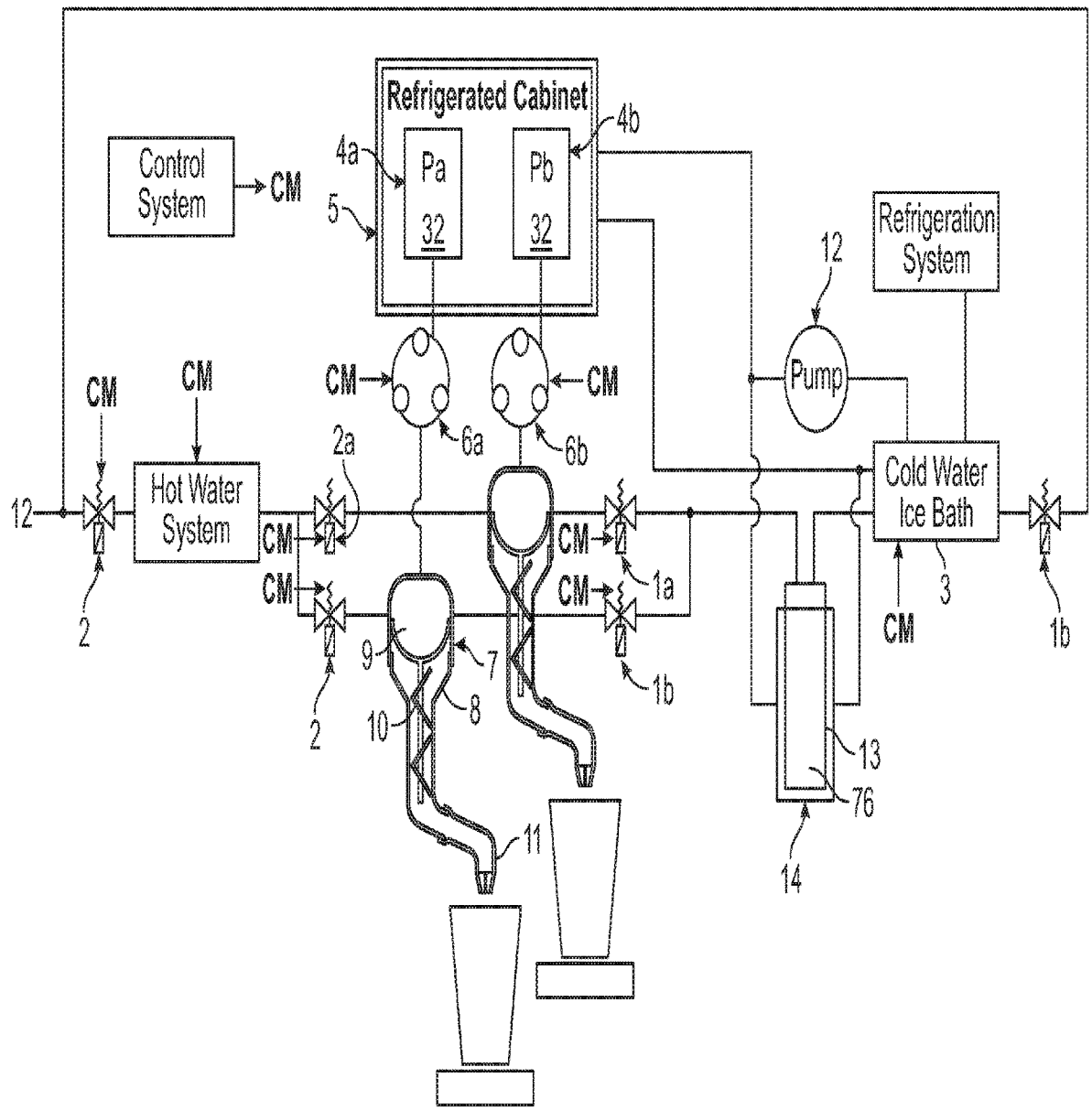
FIG. 5A is generally identical to FIG. 5, except a carbonator has been included in the cold water line, before the multiple common chambers and mixers.
Figure 6C:
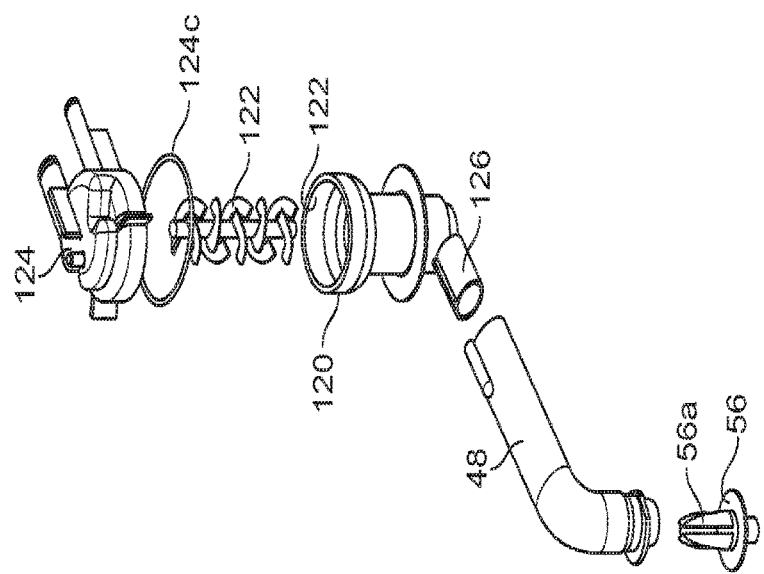
Figure 6D:
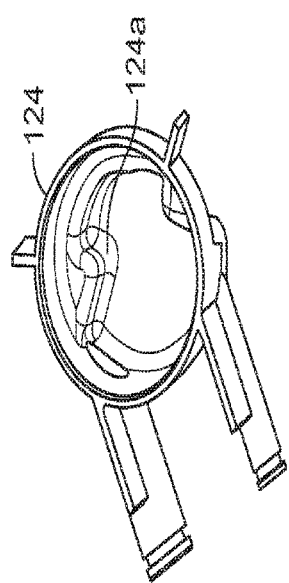
Figure 7:
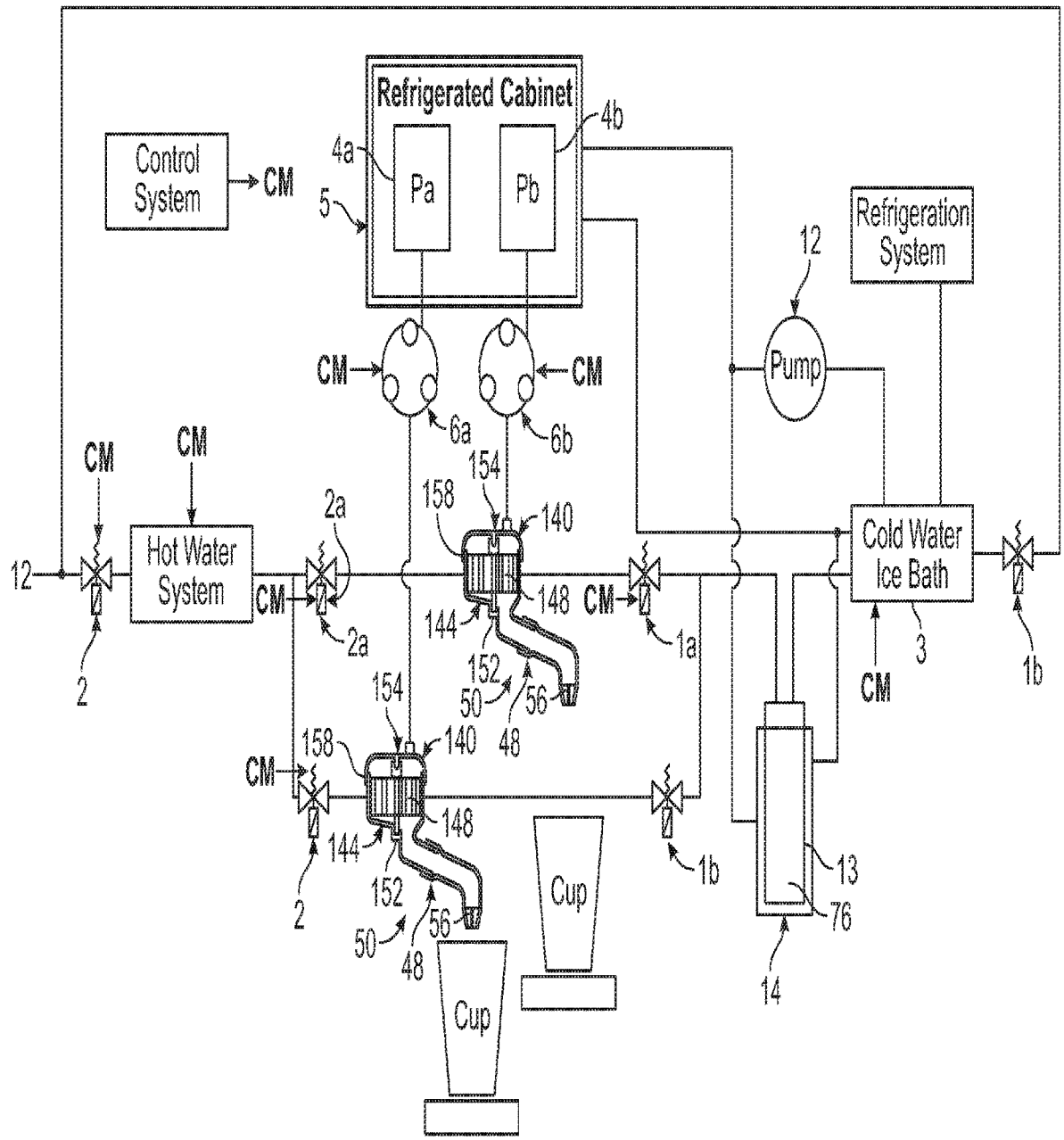
FIG. 7 is a view similar to FIG. 5, but showing instead of the vortex static mixers, two common chamber and dynamic rotating impeller mixers like those shown in FIGS. 8A to 8E.
Figure 8C:
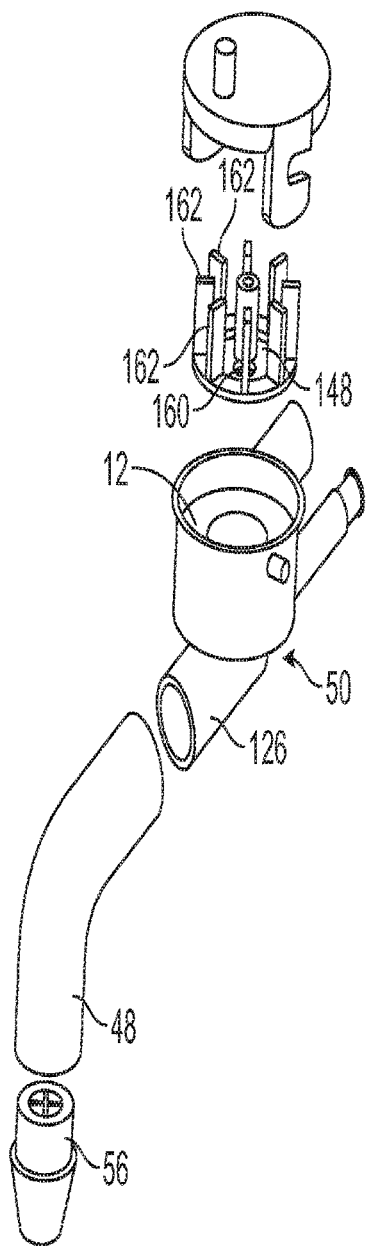
Figure 8D:
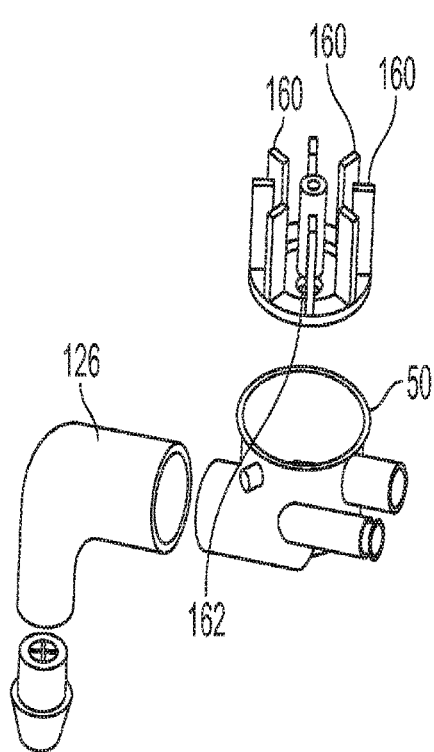
Figure 8E:
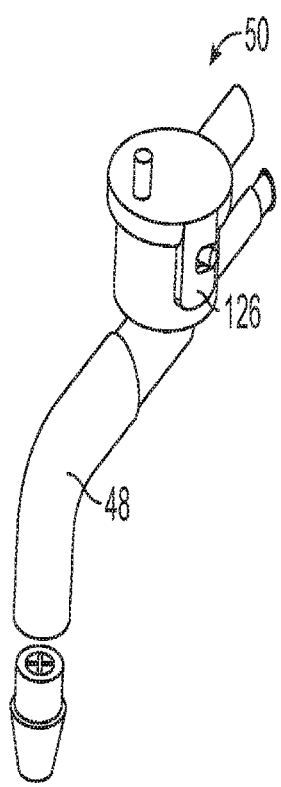
Figure 9A:
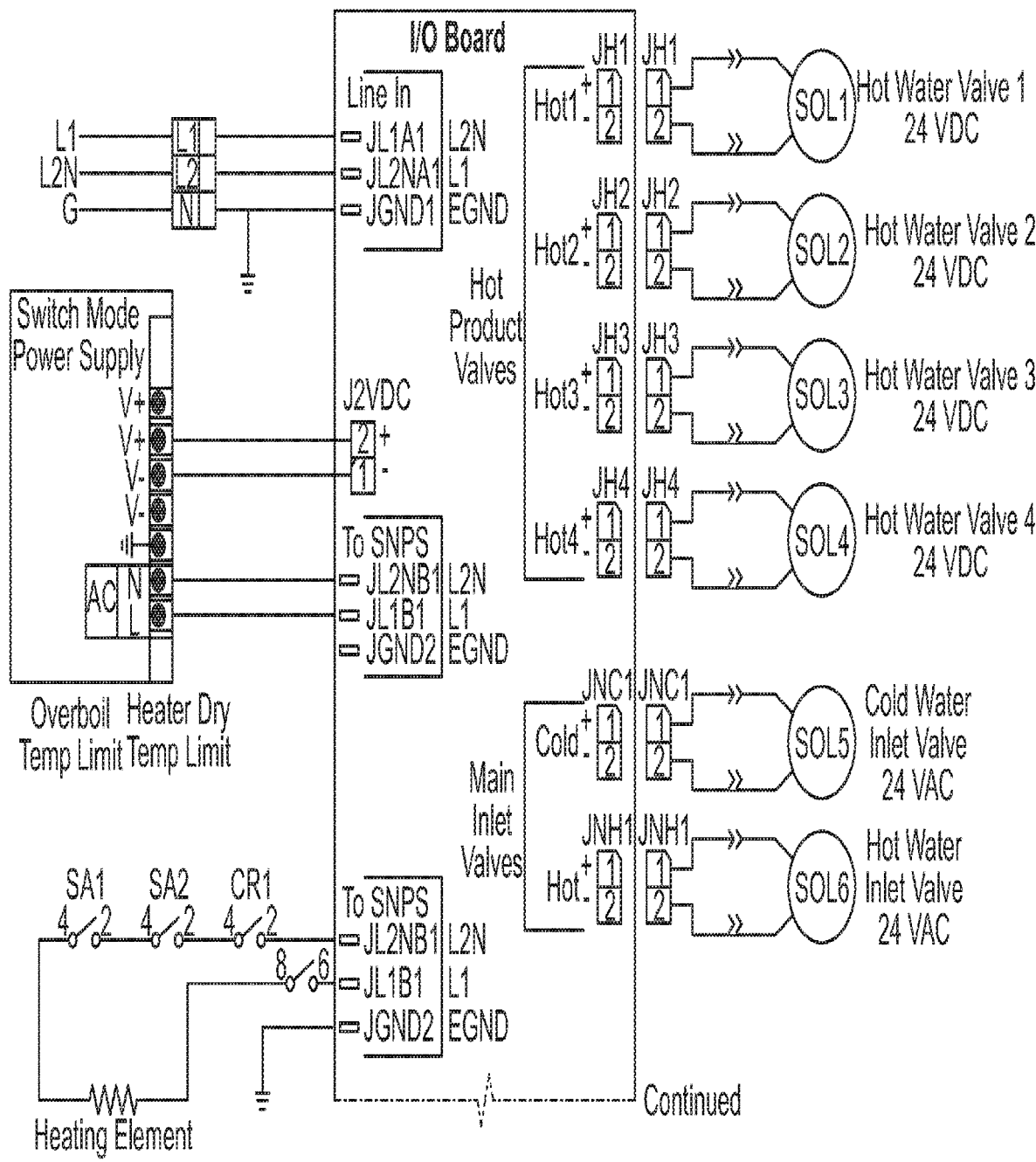
FIGS. 9A, B and C are a schematic of portions of the electrical system for the dispenser.
Figure 9B:
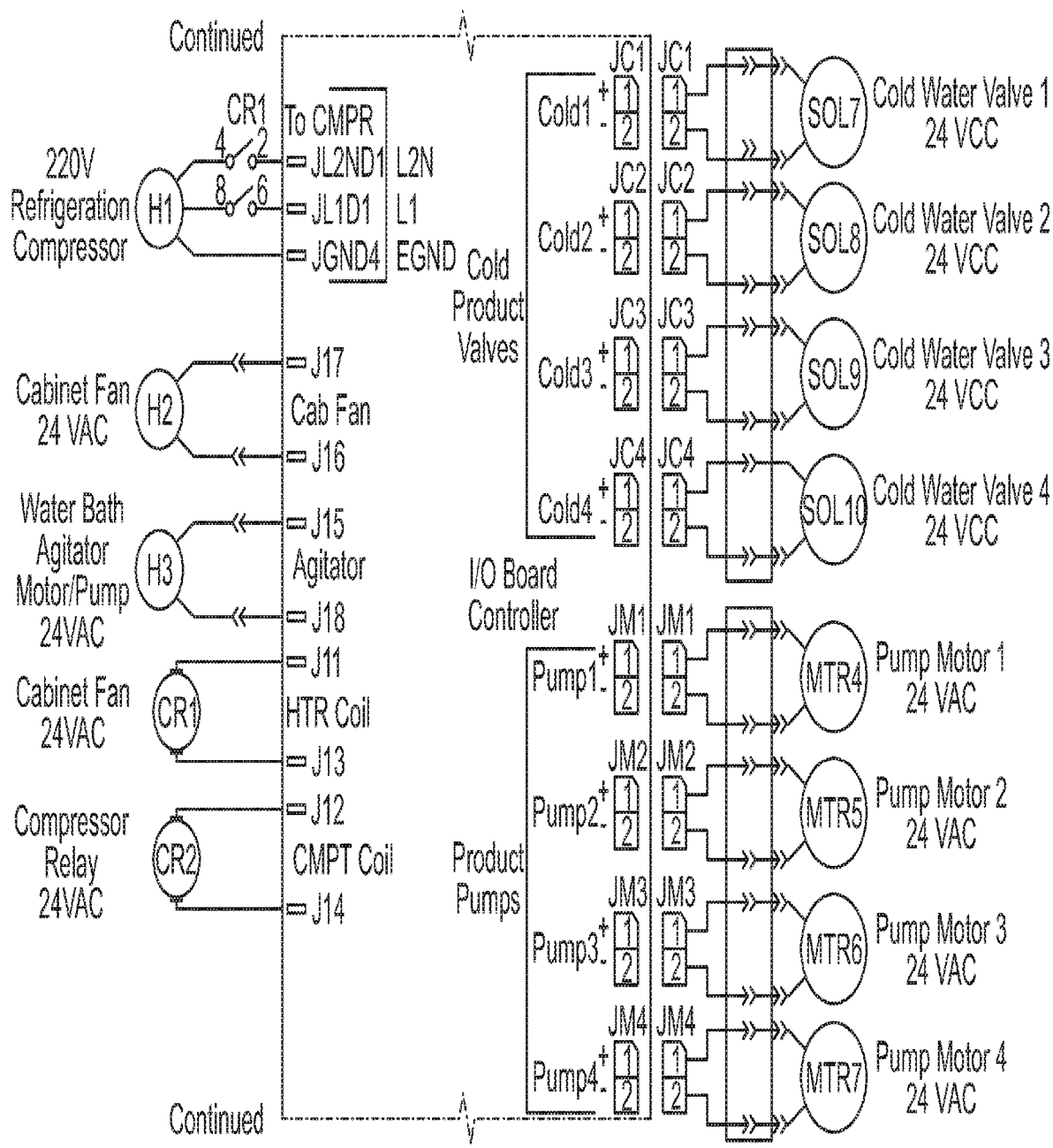
Figure 9C:
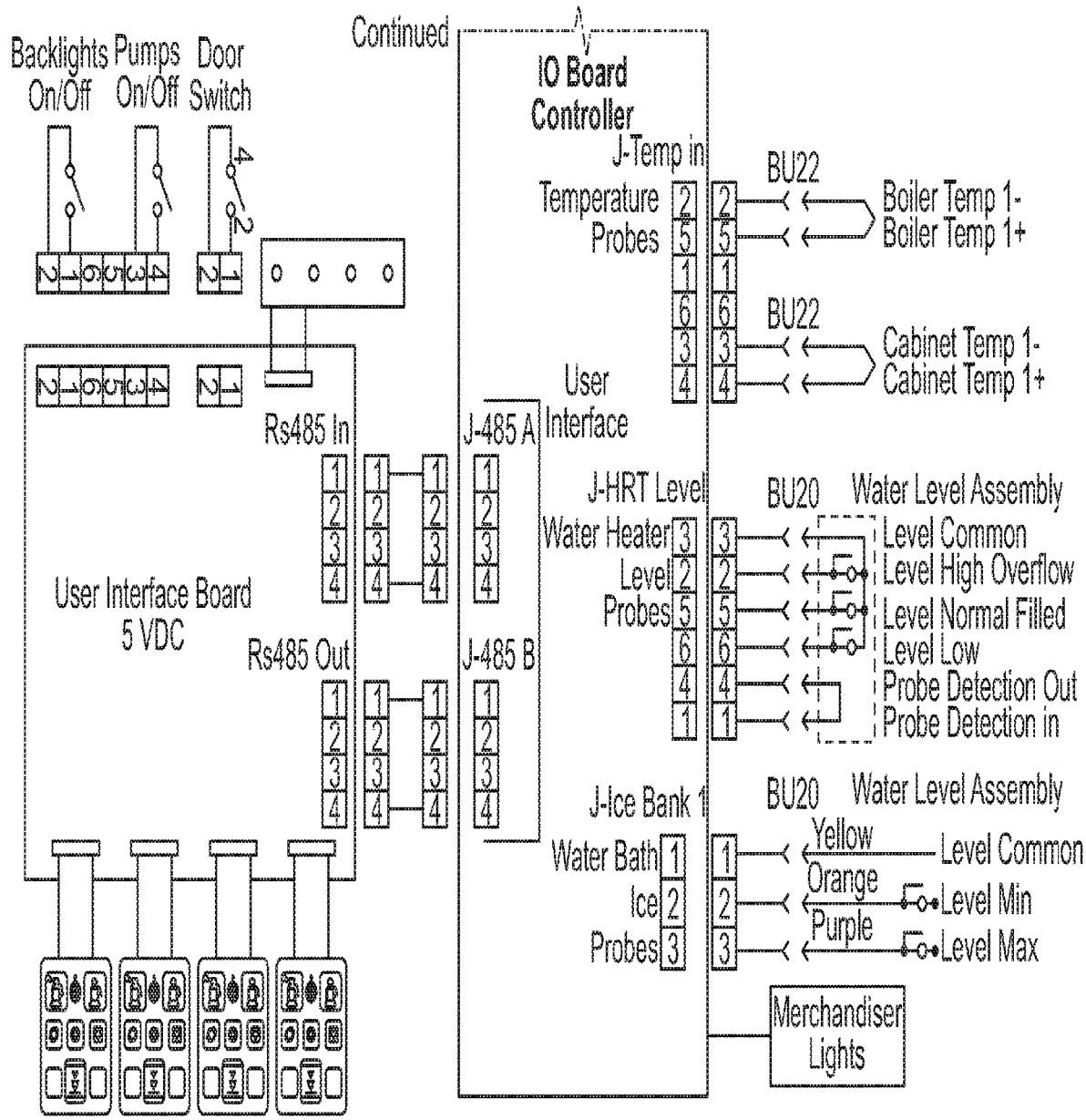
Figure 10A:
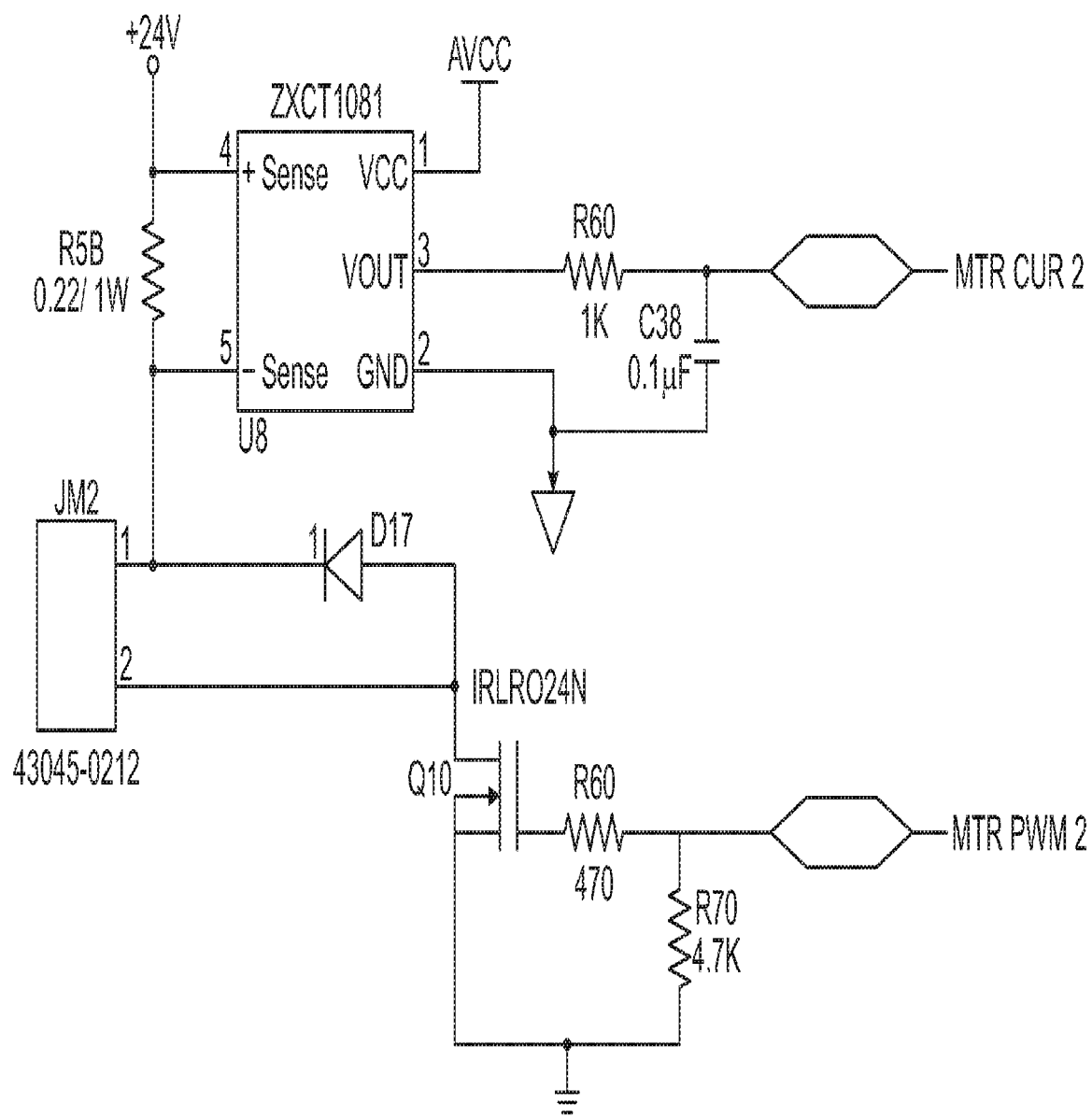
FIGS. 10A and B are schematics for determining pump current (proportional to pump speed) for volume ascertation of flavor concentrate delivery.
Figure 10B:
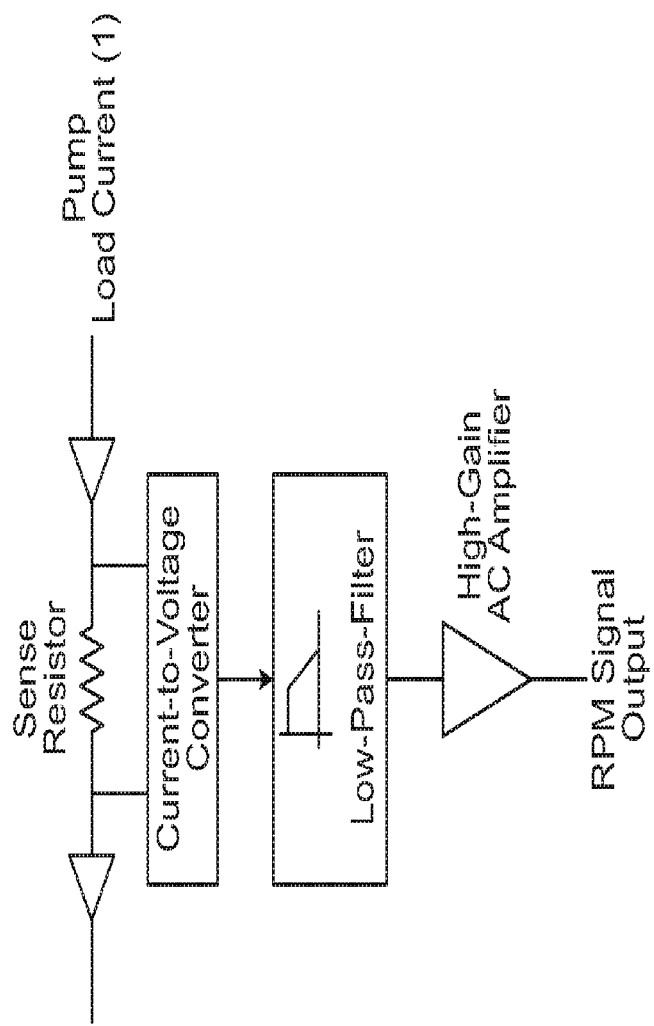

Referring to FIGS. 1 to 12, a beverage dispenser 10 and method is provided that can deliver both a hot or cold beverage formed in the same or common chamber 12 (see FIGS. 2 to 8E). The beverage dispenser of the present invention can provide, as desire, a soda, juice, coffee, tea, carbonated or non-carbonated, and hot or cold beverages. For example, and not by limitation, a hot or cold coffee or hot or cold tea could be delivered, or a carbonated or non-carbonated soda or juice could be delivered. All these beverages can be formed in the common chamber 12 to which the necessary flavor concentrates and/or or both hot and cold water can be delivered, as selected or desired. In fact, various ratios of hot to cold water can be delivered to form a beverage of different, desired temperatures, from hot (all hot water—no cold water), to any intermediate temperature (various amount of hot and cold water), to cold, (all cold water—no hot water). Similarly, the strength or amount of the flavor concentrate can also be varied too, from full strength to weak strength, selected or as desired. This flavor variance can be brought about by providing a beverage with various, desired or selected Brix.

The dispenser 10 includes a hot water heating system 16 and refrigeration cooling system 18. See FIGS. 1-4. As to FIG. 4, the following are shown thereon.

| Valves and Mtrs | Systems and Sensors |
|---|---|
| V1 = Water Valve In | CO-Condensor |
| V2 = Water Valve Boiler Pump | EVAP1 = Evaporator Cabinet |
| V3-6 = Water Valve Product Boiler Out (X4) | EVAP1 = Evaporator Ice Bath WC = Water Coil |
| V7-11 = Cold Water Valve Out (X4) (1 for each Dispense Point) | M1 = Mixing Chamber/Nozzle Li = Level Probe Boiler |
| F11-13 = Flow Control | SENE1 = Clixon Overflow |
| M1 = Refrigeration Compressor | Temperature Limiter |
| M2 = Ice Bath Recirc/Cabinet Pump | SENE2 = Temperature Sensor Boiler |
| M3 to 5 = Peristaltic Pump | SENE3 = Heater Temperature Limiter |
| M6 = Cabinet Fan | SENE4 = Ice Probe |
| M7 = Condensor Fan | |
| H1 = Heating Element | |

The dispenser serves both hot and cold drinks. Cold drinks could have the option of being still water drinks or carbonated water drinks. The carbonated water drinks may have multiple or various levels of carbonation and the dispenser can include a carbonator in the dispenser cold water line before the common chamber 12 and mixer.

The dispenser takes a common water input 20, such as a city water supply and can either have or divide it into a hot water input 22 and cold water input 24. The multiple water inputs are for the cold circuit system 26 and the hot circuit system 28. If the city water pressure is high a pressure reducing regulator (not shown) could be provided.

Alternatively, as noted above, the dispenser could move a supply input that separates into two inputs that would allow external cooling and heating water systems (not shown) that can be connected to increase dispenser drink capacity. Having these two separate inlets thus prevents these extra external systems impacting either the hot or cold supply for the alternative system.

The dispenser 10 comprises a cooled storage cabinet 30 for storage of concentrated or ready to drink product 32 therein. The cabinet 30 is comprised of a pumping portion section or level 34 and a storage section or portion 36. The product 32 could be stored in bib (bag in box) or in formed bag holders. The bag holders can be stored side by side and spaced apart somewhat (say ¼ inch) and allow for cool air to be circulated around the product bags. The storage cabinet has a door 38 that can open and close for loading the product. The door consists of a unique interface (see FIGS. 1 and 9A to C) that allows for portion control dispense, free flow, notification, and programming, sometimes referred to as the door system 40. The door also has insertable product identification graphics that have the option of being back lighted.

The cabinet 30, door system 40, and cup rest 42 have design innovations that include a targeting device 44 built into a cup rest indicator 46, and forward reaching spout or dispense tube 48. The forward reaching dispense tube 48 directs the beverage so that is actually in-line or in front of the door 38. That forward reaching position is different from the usual under dispenser position. The targeting device attachment 44 is either chromed or vacuum metalized thus allow for easy targeting. This targeting device is located on the door 38 that opens and closes and is important because it aids user visibility to the product tube or spout 48 that is part of the mixing chamber assembly 50. The dispenser body 52 below the cabinet has a concave section of horizontal depth and vertical clearance that allows for the cabinet 30 to be recessed further back in horizontal depth. The dispense tube 48 is then brought forward to move it closer to the front 54 of the machine. This machine has a door 40A and cabinet split line 40B that is flush with the back splash 40C of the unit. Visibility of the nozzle or dispense point 56 is important especially when as here that hot beverage may be dispensed. This design provides the front 40D of the door to be within and over the drip tray 58 and cup rest 42 vertical location or plane.

The drip tray 58 has the option during install of being hard plumbed to a drain or a lift and pour out tray to drain. The pour out style the tray is designed to be removed with no tools required. The drip tray contains the cup rest 42 that has a formed target pattern 44 for cup locating and targeting that sits below the surface of the main cup rest 42. The drip tray also allows for multiple drains to be channeled to it that are located behind the back splash assembly panel. This design allows access to remove the mixing body assembly even if the door is closed via the vertical recessed space (see FIG.

2) feature in the concave back splash part. Of course removal usually occurs with the door open.

This dispenser uses mechanical refrigeration 18 to create an ice bank 70 in an ice water bath 72 similar to that in the IMI Cornelius "Impulse" product line. The cold water from the ice bath 72 is then re-circulated to the cabinet heat exchanger 74 to cool the same. The return of the water from the cabinet heat exchanger 74 can be used to pre-chill the water entering into the ice bath water coil or for heat exchange of a carbonator tank or system 76, if carbonated water is also provided in the dispenser 10. This cooling allows for improved carbonation consistency as obtained with other "Cornelius" cold carb systems.

The dispenser 10 also comprises a water flow rate management system 80. The dispenser has been designed to allow hot water, cold water and carbonated water to be mixed with product or flavor concentrate. For this mixing it is important to insure accurate and consistent water flow rates and concentrate delivery rates. The concentrate delivery flow rate is obtained by current sensing variable voltage control to a pump device 84. The different pump speeds and currents are correlated to different concentrate strengths which could vary from say 3 to 1 to 6 to 1 or higher. The hot water flow rate(s) is controlled with a single valve 86 or with individual similar valves for each dispense point or spout. Each single valve 86 is an electronically controlled valve that could vary the water flow rate output based on the desired concentrate strength and flow rate. The individual valves 86 could be preset flow rate valves or electronically controlled valves based on applications. The concentrate delivery, via variable speed pump motor 90 speed, is adjusted to achieve the ratio (Brix) requirement of the product (i.e. 5:1 or 4:1). In some situations if a new product is loaded into the dispenser or machine 10 or cabinet 30 and the desired ratio of water to syrup or concentrate is higher (i.e. 7:1) then the water flow rate may need to adjusted (increased). In these situations multiple valves (for example both for hot and cold water) could be activated and the resulting total flow is the combination of all the open valve flow rates. This multiple valve activation increases the width of the product concentrate operating window.

The dispenser could have 1, 2, 3, 4, 5 . . . 12 or more flavor/spouts.

Construction of the cabinet 30 is of a plastic inner liner attached via adhesives or mechanically to aluminum, stainless steel or other metal wrapper. The dissimilar materials used (plastic or metal) provides an additional interface thermal barrier between the two parts and would lessen the heat transfer from one to other thus minimizing potential condensation on the outer metal surfaces. The plastic liner may have the following features;

Drain opening in its bottom thus providing a path for spilled water, syrup or concentrate, cleaning etc.

The bottom surface in which the drain is located is also pitched to said drain, this would avoids pools of liquid standing inside liner The back wall provides a recess or duct from liner bottom to top in which colder air is draw from the bottom via a fan, thru heat exchanger, i.e. finned evaporator which provides recircled cold water from the dispenser or unit's water bath system, up to the top thru the fan then out into the cabinet.

Mounting holes on its sides for rack clips. These rack clips hold and lock in place both the syrup or concentrate pump system and syrup box (product) wire racks. The clips can be moved into different locations to accommodate different syrup box sizes, pumps, etc. These clips are also easily replaceable if broken.

Both concentrate or syrup pumps on level 34 and concentrate or syrup boxes 32 systems are mounted onto wire racks 92. These wire racks 92 promote maximum and even air flow circulation and temperature distribution as they do not impede air flow in and around the syrup boxes and water lines contained in said cabinet as would say a solid sheet metal part possibly causes 'dead' areas in areas or zones within the cabinet.

The top panel of the dispenser machine contains a raised lip 94 (FIG. 1) around the fan in which exhaust air from the condenser of the refrigeration system is expelled.

The raised lip 94 prevents say water ingress into the machine, i.e. accidental spills from cleaning. The door hinge design provides the following features;

Strength to prevent damage if unit is moved or lifted if door is opened to its full travel or closed.

Over travel feature to prevent door from damaging itself or the surrounding cladding on the unit.

Top hinge provides wire access thru its axial point which lessens the damage/pinch point to door wires/harnesses.

The door design includes a lighted display of the products being served. The front door has brand and flavor translights. Theses are lighted from the backside. The lighting source is a LED illuminated panel. The LED lights are located on the edge of the panel and the light is directed into the edge of the panel. The pattern on the panel turns the light towards the back side of the translight. The panel could be decorated to only allow certain areas to illuminated. The brand translights are curved on the top half to provide a more aesthetic light illumination and visibility.

Figure 11:
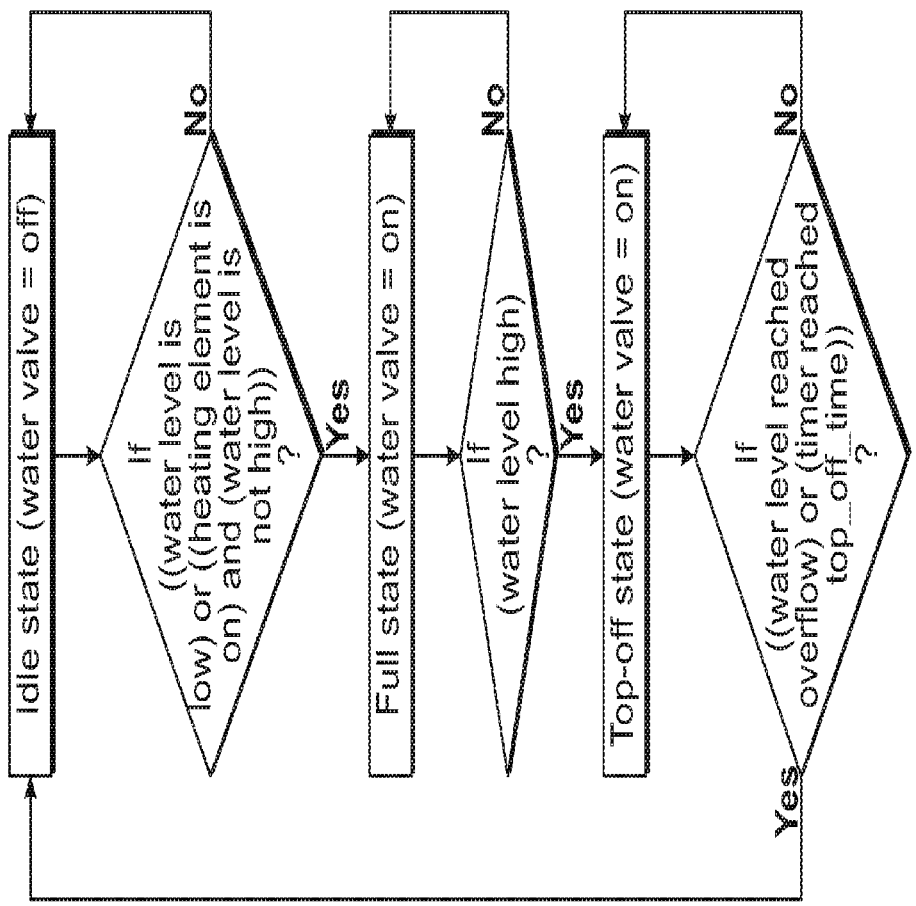
FIG. 11 is a schematic for the water control system for refilling the heater and has an "idle state", a fill "state" and when nearing the top level a "top off state".
Figure 12:
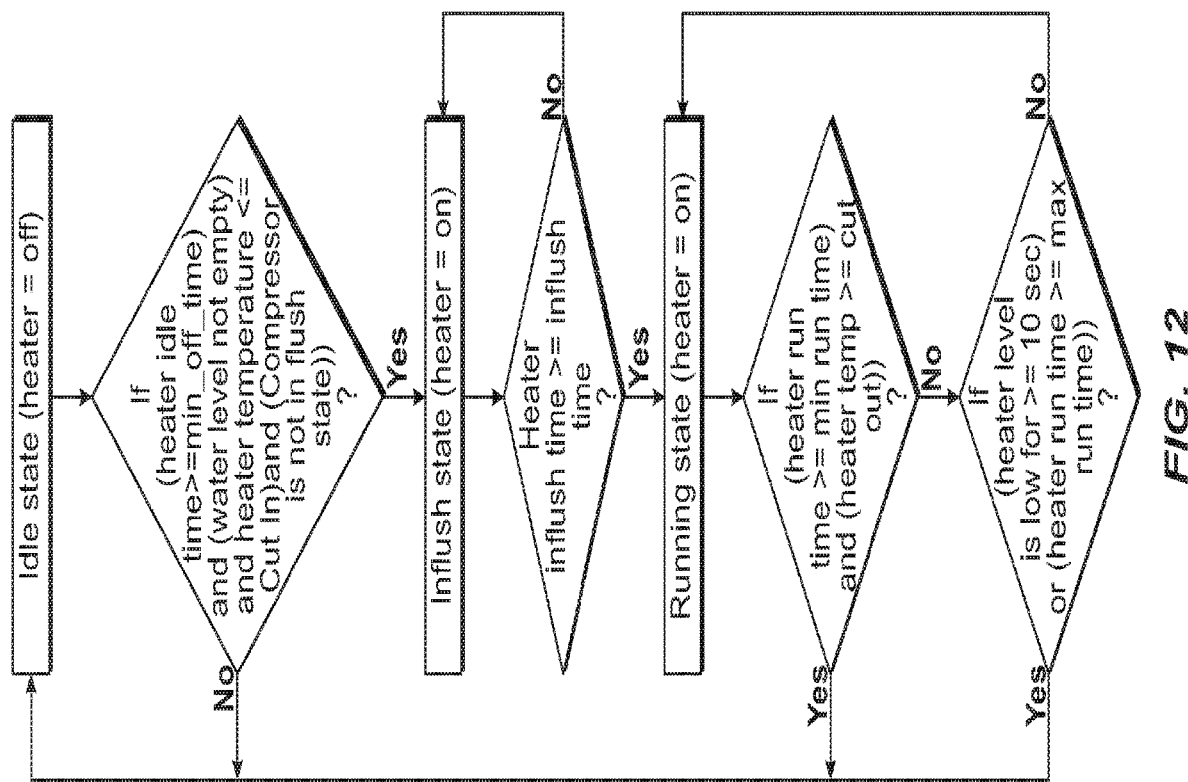
FIG. 12 is a schematic for the heater control and has an "idle state", a "inrush state" and then a "running state".

The controls of the unit utilize intelligent management via the controller 96 for the ice bank and heater. The controls prevent a large in-rush of electrical current by having a management algorithm that staggers the turning on of multiple devices such as the compressor, heater or its element, valves, etc. Algorithm also manages the operation of the heater element and heater refill. Flow charts for the algorithm for heater fill and operation are shown in FIG. 11. Flow chart for the algorithm for the heater operation is shown in FIG. 12. Each of these algorithms provide for the "idle state", "fill state" and "run state" operation and improve heater and water fill efficiency, particularly during initiation of refilling the heater to increase the ability to deliver hot water.

The water heater control conserves energy with a special filling algorithm. These three probes 2(+) and 1(−) establish or show the presence of two currents between one − and the current (−) and the other between the other + and then common, which are used to control operations. The electrical probes provide for a high-cutout, mid-start refill, and low-refill or cut in (−). The heater normally fills only when the liquid level is below the low-level (cut-in) probe. However, an algorithm (see FIGS. 11 and 12) is introduced which will fill the water heater when the level is below the high-level (cut-out) probe and the heating element is energized. This mid-cycle filling will decrease the number of heating cycles over time, and thus save energy by reducing heating element 171 in-rush losses and increasing heater and heating element lifetime.

The water heater control conserves energy by lowering the heating element cut-in and cut-out temperatures when the dispense switch is OFF. This will reduce the number of heating cycles over time, thus saving energy by diminishing heat loss, reducing heating element 17 in-rush losses, and increasing heating element lifetime.

The dispenser may provide fully adjustable beverage temperatures by mixing hot and cold water supplies to obtain intermediate temperature beverages.

As noted above, a novel feature is the addition of the desired or selected (eg. strong-medium-weak) amount of flavor to a known quantity of water, into a common or single (for both cold or hot water) mixing chamber. As noted, this is believed to be a feature not heretofore provided.

The ingredients, whether with hot or cold water or various proportions of each, are mixed with the selected flavor concentrate by adding the flavor concentrate and shearing it with the water flow as the flavor flows into the top of the mixing chamber 50, the flavor and water moving in different directions or at angles to each other, and preferably perpendicular to each other. To determine the amount of flavor concentrate delivered, a peristaltic pump or other type pump 100 driven by an electric motor 102 is used. The motor 100 generally drives a high ratio gear box 106, which in turn drives the peristaltic or other pump 100. The motor 102 operates at a relatively high speed (say from 9000 to 12000 rpm, and preferably about 9250 rpm+/−50 rpm). The motor driven a gear box 106, which could be of a multiple gear or worm type to give a high gear ratio of say 100:1 to 10:1 to 1, with preferably about 40:1+/−10:1. It has been found that with the high speed electric motor driving the peristaltic or other displacement pump through a high ratio gear box, the rate of flavor delivery becomes sufficiently proportional to the amount of current drawn by the motor. As it is easily determined whether this motor current is flowing or not, and its valve from the time the current flows the volume (Vt) or weight (Wt) of flavor delivered can be determined from:

$$Vt \text{ or } Wt = K \times I \times \Delta T$$

Where Vt or Wt is volume or weight for a given time
K is a constant
I is the average current sensed when the pump is driven, and
ΔT is the time the current is on.

Invention also comprises apparatus and method of detecting and resolving speed (RPM) of a peristaltic or other suitable (such as microdiaphragm pump, cylinder piston pump, vane pump or other displacement pump) pump used in beverage delivery systems. Measuring the speed of a positive displacement pump non-intrusively or its motor speed via current allows the system to determine and control volume of liquid product or concentrate delivered so as to maintain proper ratio among a plurality of products to be mixed and/or dispense expected total volumes, with little concern for product contamination.

Figure 13:
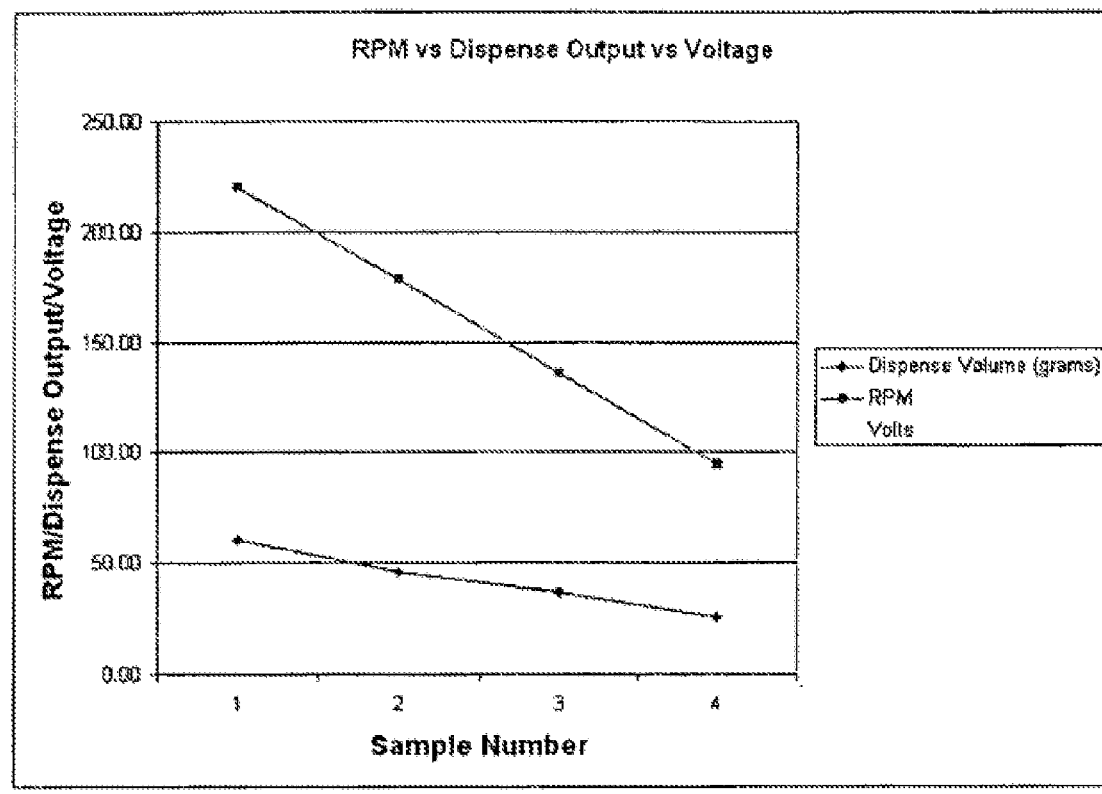
FIG. 13 is a graph and a table having associated values. The graph shows the relationship between RPM of the motor gear box, the dispensing volume, and the voltage.

The pump 100 in this application contains a series (three or more) of rollers 110 that rotate about a fixed point. The medium to be pumped is contained in a section of flexible tubing 114 mounted inside the pump. The series of rollers alternately open and occlude a section of the tubing during rotation, providing a pumping action that displaces a generally constant, known volume of the medium. The pump 100 is driven by the motor 102 and gearbox 106 combination whose motor current is sensed in a manner shown in FIG. 10A. The current in the system increases during an occlusion of the tubing, due to loading of the motor, above a known nominal value. If the sensed current is low a feedback circuit causes the voltage supplied to that pump motor to increase until the desired current is reached. Should the sensed current be higher than desired, the feedback circuit causes the voltage to that pump motor to be lowered so that the desired current is reached. It has been found with the pump motor gearbox and displacement pump arrangement of the present invention that combination of motor gearbox and pump will deliver a constant ascertainable rate of flow. Thus, sensing the current for a known combination can give an accurate rate of flow and by knowing the time the rate of flow is delivered the quantity of flow is also known. Thus, by delivering selected flows of flavor or syrup to the known quantity of water, the Brix of the beverage can be adjusted. FIG. 13 is a graph and a table having associated values. The graph shows the relationship between RPM of the motor gear box, the dispensing volume, and the voltage.

Concentrate Pump Setup for Known Water Flow.
Calculations:
Step 1: Ratio Calculation
　CD=Concentrate Dispensed (ounces)
　WD=Water Dispensed (ounces)
　W=Water Ratio
　C=Concentrate Ratio
　V=End Volume
　Formulas:

$$CD = C/(W+C) * V$$

$$WD = W/(W+C) * V$$

Step 2: Flow Rate Per Water Ratio Calculation

| | Common Calculated Ratio Volumes (oz) | | |
|---|---|---|---|
| Ratio's | Concentrate (CD) | Water (WD) | Drink Size |
| 2:1 | 4 | 8 | 12 |
| 3:1 | 3 | 9 | 12 |
| 4:1 | 2.4 | 9.6 | 12 |
| 5:1 | 2 | 10 | 12 |
| 7:1 | 1.5 | 10.5 | 12 |

DT=Dispense Time (seconds)
　Variable Constant
　FW=Desired Flow rate of water (set at 1.84 for this example)
　Formula:

$$DT = WD/FW$$

Step 3: Flow Rate Per Ratio Concentrate Calculation
　CFS1=Desired Concentrate Flow rate (ounces per second)
　Formula:

$$CFS1 = CD/DT$$

Step 4: Pump RPM vs Ratio Concentrate Calculation
　CFS2=Actual Concentrate flow rate VS pump speed
　GBR=Gear Box Speed (RPM) Revolutions per minute
　GBS=Gear Box Speed (RPS) Revolutions per Second
　Constants
　T1=60 SECONDS (1 MINUTE)
　d1=Fluid displacement @ 1 RPM for a given tubing diameter and peristaltic pump design. (Pump design dependent)
　Formulas:

$$GBS = GBR/T1$$

$$CFS2 = GBS * d1$$

EXAMPLE

1. Calculating Ratio for a 12 oz Drink @ 3:1
CD=Concentrate Dispensed (ounces)
WD=Water Dispensed (ounces)
W=3
C=1
V=End Volume The calculation for the concentrate would be.

$$CD = C/(W+C)*V$$

$$CD = 1/(3+1)*12$$

$$CD = 3 \text{ oz}$$

The calculation for the water would be.

$$WD = W(W+C)*V$$

$$WD = 3/(3+1)*12$$

$$WD = 9 \text{ oz}$$

2. Flow Rate Per Water Ratio Calculation
DT=Dispense Time (seconds)
FW=1.84 oz/sec
The calculation would be:

$$DT = WD/FW$$

$$DT = 9 \text{ oz}/1.84 \text{ oz/sec}$$

$$DT = 4.89 \text{ sec}$$

3. Flow Rate Per Ratio Concentrate Calculation
CFS1=Desired Concentrate Flow rate (ounces per second)
The calculation would be:

$$CFS1 = CD/DT$$

$$CFS1 = 3 \text{ oz}/4.89 \text{ sec}$$

$$CFS1 = 0.61 \text{ oz-sec.}$$

4. Pump RPN vs Ratio Concentrate Calculation
Assuming a speed of 231 rpm
CFS2=Actual Concentrate flow rate VS pump speed
GBR=231 rpm
GBS=Gear Box Speed (RPS) Revolutions per Second
Constants
T1=60 SECONDS (1 MINUTE)
d1=0.159
Formulas:

$$GBS = GBR/T1$$

$$GBS = 231/60$$

$$GBS = 3.85$$

$$CFS2 = GBS * d1$$

$$CFS2 = 3.85 * 0.159$$

$$CFS2 = 0.61$$

Hardware electronics (see FIGS. 9A to C and FIGS. 10A and B) includes three principal blocks: 1) a circuit that detects the current and translates it to a value usable by the system 2) a low-pass filter that removes unwanted artifact or noise s such as motor brush noise and finally 3) a high-gain AC amplifier whose gain is chosen to convert the disturbances in the current from each occlusion to a pulse whose length in time is proportional to the time the tubing is occluded.

FIG. 11 is a schematic for the water control system for refilling the heater and has an "idle state," a "fill state" and when nearing the top level a "top off state".

FIG. 12 is a schematic for the heater control and has idle state, inrush state and then a running state.

The software routine in this invention monitors the measurement data. The length of pulses (tubing between rollers) is measured and compared with the known characteristics of the pump to determine the amount of product delivered for each pulse. Measuring the time from one pulse to the next results in the RPM of the pump and is proportional to the rate of product or concentrate delivery. This data is used to set a desired ratio among multiple pumps delivering i.e. water and concentrated liquid or flavor product to produce a known mixture.

In most cases, the data will be used to modify pump speed as well as on/off condition to dispense a drink of a particular Brix and total volume.

Thus, when a known quantity of water is delivered over $\Delta T$, then the Brix can be adjusted or changed and the amount of flavor delivered by controlling or sensing the current I of the peristaltic or other pump motor.

The various selection and operating parameters can be selected and inputted into a digital controller and software program to control the operation of this beverage dispenser.

The mixer includes a static mixer (see FIGS. 2, 3, 4, 5 and particularly 6A to D) capable of dispensing from a single point 56 or spout 48 a hot or cold liquid mixed with a concentrate.

This invention addresses the need to be able to dispense from a single concentrate container a hot or cold beverage from a single nozzle point. The liquids need to be mixed with the concentrate which could vary in viscosity, uniformly and dispense at flow rates over 2 oz/sec draw rates. They also have to be able to fit in a limited space to be placed in a cooled cabinet.

The mixer (see FIGS. 6A to D) has a two piece 120 and 122 closed by a top 124 mixing body with the "Vortex" static mixer, outlet tube 126 and flow director. The top body interfaces with the concentrate tube input and hot and cold water line. The bottom section 120 interfaces to the top 124 to create a sealed unit. The "Vortex" or helix flight (a mere series of two blades stacked atop each other with each of the two blades set at angles to cause the flows off the blades to mix) mixer fits inside the body. There is a 90 degree outlet 126 at the bottom of the body 120 where the outlet spout or tube 48 is attached. The outlet tube 48 has a straight section that bends 90 degrees and holds the flow director or nozzle 56.

The Vortex Mixer Theory of Operation can be broken down into three stages:

The top of the mixer body (seen in FIG. 6D) is such that it diverts the water into the path of the concentrate, but does not allow liquid to spin into the water or flavor inlet tubes. The liquid is allowed to spin below the mixer top in the body 120 and then into the Vortex mixer.

Stage 1: Hot and/or Cold water enters the side of the top of the mixer. Concentrate is pumped from the top. The concentrate input is positioned at the front of the mixer body. The location of the water inputs create a spinning motion of the water that is diffused by 124A to keep liquid from spinning into the opposite water input but allowed to shear across the concentrate path to begin first stage mixing. The shape and geometry of the "Vortex" mixer allow two paths of liquid to shear the path of the concentrate without contamination to either water inlet. It also reduces the risk of slugging of concentrate that can build up on surfaces due to high viscosity or low temperature and may be difficult to mix and forced out the mixer outlet.

Stage 2: Water and concentrate exit the spherical section of the mixer top and are directed to the spiral helical mixer vertical sets of blades where it is sheared together multiple times completing the second stage.

Stage 3: Fluid exits mixing body and enters delivery tube where nozzles 56 direct fluid into a controlled stream. This plug at 56 also smooth's the flow eliminating pulsing caused in many systems by the concentrate pump.

The mixer will be completely emptied after each dispense to allow cold and hot liquid beverage to be dispensed from a single nozzle.

System allows for cleaning with between different drink dispensers. Generally the rinse water is the same as in the drink. The last portion of a dispense is water for rinsing the common chamber.

The advantages of the invention are that the both hot and cold liquids, drinks or beverage mixer and spout can be dispensed at desired temperatures.

The system also allows for a hot water rinse for periodic cleaning for sanitation purposes, say once or twice a day or more often as desired. The mixer also allows high viscosity fluids to be mixed due to the vortex action. The mixer reduces the chance of remnant concentrate in the drink cup due to lack of mixing. The mixer also reduces stratification in the drink cup that inferior mixing creates.

Instead of or in addition to a static mixer 50, a dynamic mixer 50' (see FIGS. 8A to 8E) can be provided.

The dynamic mixer 50' includes a top 140, a body 144 and involves a two piece mixing body with the "Vortex Dynamic", outlet tube 48 and flow director insert at the discharge point 56. The top body 140 interfaces with the concentrate tube input and hot and cold water lines. The bottom section 144 interfaces to the top 140 to create a sealed unit. A "Vortex Impeller" 148 fits inside the body 144 over a shaft 152 molded in the lower section of the mixing body. There is a second shaft 154 molded in the top 140 of the mixing body that aligns with a hole 158 in the center of the "Vortex Impeller" when the top 140 is clipped or snapped into place. There is a 90 degree outlet 126 at the bottom of the body 144 where the outlet tube or spout 48 is attached. The outlet tube 48 has a straight section then bends 90 degrees and holds the outlet flow insert and director or nozzle 56.

The Vortex Dynamic Mixer Theory of Operation can be broken down into three stages:

Stage 1: Hot and/or, or both cold water enter in two separate tubes into the body of mixer. Concentrate is pumped from the top. The concentrate input is positioned at the front of the mixer body. The hot and cold water entrances are on opposite sides. The force of the water hitting the impeller mixer and spins it (counter clockwise for hot water and clockwise for cold water). Alternatively, where the hot and cold water entrances are on the same side, they would spin the impeller in the same direction. The concentrate being pumped through the top is sheared and mixed with the water by the spinning impeller.

Stage 2: Water and concentrate exit slots 160 in the middle of the impeller mixer and are directed to the nozzle or spout.

Stage 3: Fluid exits mixing body and enters delivery tube where nozzle or spout direct fluid into a controlled stream. This section also smooth's the flow eliminating pulsing caused in many systems from the concentrate pump.

The mixer will be completely emptied after each dispense to allow cold and hot liquid to be dispensed from a single nozzle.

All parts are removable for cleaning or will allow for "Hot Water" for cleaning.

The advantages of the invention are that the both hot and cold liquids can be dispensed at desired temperatures. This dynamic mixer does not use a static mixer thus requires a much smaller height mixing body and resultant dispenser height. (Alternatively the dynamic mixer could discharge its content to a further below located static mixer). This shortened path of the dynamic mixer reduces the delay in the product exiting the mixing body. The spinning action of the impeller also allows high viscosity fluids to be mixed due to the spinning agitation caused by the impeller. The mixer reduces the chance of remnant concentrate in the drink cup due to lack of mixing. The mixer reduces stratification in the drink cup that result in inferior mixing methods.

The dynamic mixer has a hot water input (flowing) into it (under gravity) and/or cold a water input (not under gravity but under city water supply or reduced pressure) injected generally tangentially into the mixing chamber. The water enters generally perpendicularly and tangentially to the axis of the chamber, but at some radius from its center. Mounted rotatably in the chamber on generally near its axis, is the impeller which has a vertical axis which is close to the axis of the chamber. The hot or cold water or both, entering the chamber causes the impeller to rotate and further shear the flavor and mix it into the water. Generally, for spacing purposes to obtain the separate location for the same in the chamber, the hot and cold waters entrances could be spaced apart and on opposite sides, which would cause the impeller to rotate in different directions depending which water was used. Where both hot and cold water are to be injected simultaneously, then it may be advantageous to place the hot and cold water entrances on the same side of the chamber so that either drives the impeller in the same direction, rather than opposite directions or tend to stall the same.

The liquids hot and/or cold water and flavors move toward the open bottom and near center of the impellor and are discharged either into a delivery sprout 48 and into the cup of or for the customer, or if provided, into a lower static mixer then into the spout and/or cup of the customer.

The finished beverage may be discharged from the mixer (static, dynamic, or both) to an extended spout 48 which extends away from the dispenser, in contrast to prior art spouts which were semi hidden and partly or completely under the dispenser, and difficult for the customer to see, use, and do so without spillage.

The hot water is supplied for the dispense by a vented to atmosphere hot water heater 170, so no pressure or boiler requirements need be met. The heater 170 is higher than the mixing chamber 50 or 50' and utilizes the top couple of inches of the heater tank for discharge to the mixing chamber solely by gravity. Replacement water is brought into the bottom at 174 of the heater and heated as it moves upwardly in the heater, from which it can then be discharged as needed. Thus, the heater can provide a considerable number of hot drinks, as the cold water is not put into the top but at the bottom, wherein it can be considerably heated before it is discharged. As mentioned earlier the three + and − electrical probes control admission additional water into the heater as it is drawn off for beverages. If additional hot drink capacity is required, a separate external water heater can be inputted to the hot water circuit.

The dispenser has a refrigeration system 18, such as a compressor 200, expansion valve or device 202, evaporator 206 and condenser 210, with the compressor driven by an electric motor internal of the compressor housing 214. The evaporator is located in a cold, water bath, which provides cold water for dispense and also can provide cold water to cool by circulation thereto the flavor concentrate or concentrates in a cold storage cabinet of the dispenser to help deliver a cold (40° F. or less) drink or beverage. Concentrates for hot beverages that might not require refrigeration for preservation could, if desired, be stored elsewhere. If the hot concentrates require refrigeration for preservation, they too can be stored within the cold storage cabinet.

Of course, the beverage dispenser and its construction meet all applicable sanitary regulations and codes.

The various components, valves, solenoids, pumps, motors of the dispenser can be controlled by the digital controller (see FIGS. 9A to C) having a user/customer/operator interface or interfaces 220, which are mounted on the door 38 (door system 40), and software input/output menu so that the dispenser can be programmed, changed, controlled and operated to give the desired or selected beverage dispense.

The water and concentrate flows can be controlled to provide a water rinse of the chamber, mixer spout and nozzle, say with the last 5% of water delivered to clear and rinse the same, particularly if a different flavor is going to be provided through the same for the next drink. This rinse water portion could broadly be as much as the last 10 to 2%, or better the last 7 to 3% with about the last 5+/−2% being preferred. Thus, one batch of beverage is delivered with the last few percent of its water being used to clear or rinse the common chamber and spout for the next batch of beverage which may be a different flavor. The quantity of water rinse should be sufficient to clear the common chamber and spout but not dilute the beverage. To this extent the quantity of flavor delivered is set high enough to give the beverage including this rinse water the desired concentration of flavor.

While the preferred embodiments of the apparatus and method of the beverage dispense method and apparatus of the present invention has been disclosed, and while various elements and steps have been disclosed and claimed, it should be understood that other equivalent elements and steps fall within the appended.

What is claimed is:

1. A beverage dispenser comprising:
a body defining a common chamber and having a base liquid input configured to receive a base liquid, a concentrate input configured to receive a concentrate liquid, and an outlet tube configured to discharge a mixed beverage formed from the base liquid and the concentrate liquid;
a dynamic mixer disposed in the common chamber and having an impeller that rotates to mix the base liquid and the concentrate liquid and thereby form the mixed beverage; and a static mixer disposed in the common chamber, the static mixer configured to mix the mixed beverage, wherein the static mixer comprises a plurality of vertically stacked blades, wherein the plurality of vertically stacked blades forms a helix;
wherein the impeller is configured such that flow of the base liquid into the common chamber causes the impeller to rotate.

2. The beverage dispenser according to claim 1, wherein the impeller is configured to shear the concentrate liquid into the base liquid.

3. The beverage dispenser according to claim 1, wherein the body is elongated along an axis of elongation and wherein the base liquid enters the common chamber tangentially to the axis of elongation.

4. The beverage dispenser according to claim 3, wherein the impeller defines a vertical axis about which the impeller rotates, the vertical axis being radially offset from the axis of elongation defined by the body.

5. The beverage dispenser according to claim 4, wherein the body further comprises a lower section having a first shaft and a top having a second shaft;
wherein the impeller defines a hole; and
wherein the first shaft extends into the hole and wherein the second shaft is aligned with the first shaft.

6. The beverage dispenser according to claim 3, wherein the impeller defines exit slots through which the mixed beverage flows parallel to the axis of elongation.

7. A beverage dispenser comprising:
a body that defines a common chamber, the body having a first base liquid input configured to receive a first base liquid, a second base liquid input configured to receive a second base liquid, a concentrate input configured to receive a concentrate liquid, and an outlet tube configured to dispense a mixed beverage formed from at least one of the first and second base liquids and the concentrate liquid;
a dynamic mixer disposed in the common chamber and having an impeller that rotates to mix the at least one of the first and second base liquids and the concentrate liquid and thereby form the mixed beverage; and a static mixer disposed in the common chamber, the static mixer configured to mix the mixed beverage, wherein the static mixer comprises a plurality of vertically stacked blades, wherein the plurality of vertically stacked blades forms a helix;
wherein the impeller is configured such that flow of the at least one of the first and second base liquids into the common chamber causes the impeller to rotate.

8. The beverage dispenser according to claim 1, wherein the impeller is configured to shear the concentrate liquid into the at least one of the first and second base liquids.

9. The beverage dispenser according to claim 8, wherein the body is elongated along an axis of elongation and wherein the first and second base liquids enter the common chamber tangentially to the axis of elongation.

10. The beverage dispenser according to claim 9, wherein the first base liquid input is spaced apart from the second base liquid input.

11. The beverage dispenser according to claim 10, wherein as the first base liquid flows into the common chamber the impeller rotates in a first direction; and wherein as the second base liquid flows into the common chamber the impeller rotates in a second direction opposite the first direction.

12. The beverage dispenser according to claim 9, wherein the impeller defines a vertical axis about which the impeller rotates, the vertical axis being offset radially from the axis of elongation defined by the body.

13. The beverage dispenser according to claim 12, wherein the body further comprises a lower section having a first shaft and a top having a second shaft;
wherein the impeller defines a hole; and
wherein the first shaft extends into the hole and wherein the second shaft is aligned with the first shaft.

14. The beverage dispenser according to claim 9, wherein the impeller defines exit slots through which the mixed beverage flows.

\* \* \* \* \*

UNITED STATES PATENT AND TRADEMARK OFFICE
CERTIFICATE OF CORRECTION

| | | |
|---|---|---|
| PATENT NO. | : 10,674,863 B2 | Page 1 of 1 |
| APPLICATION NO. | : 15/267629 | |
| DATED | : June 9, 2020 | |
| INVENTOR(S) | : Scott E. Sevcik et al. | |

It is certified that error appears in the above-identified patent and that said Letters Patent is hereby corrected as shown below:

In the Claims

In Claim 8, Column 16, Line 34 "claim 1" should instead read --claim 7--

Signed and Sealed this
Seventh Day of July, 2020

Andrei Iancu
*Director of the United States Patent and Trademark Office*